(12) United States Patent
Hardebeck et al.

(10) Patent No.: US 11,115,532 B2
(45) Date of Patent: Sep. 7, 2021

(54) VISUAL ENGAGEMENT USING AUTOMATICALLY DYNAMICALLY SELECTED VISUALIZATION MEDIUMS

(71) Applicant: Glance Networks, Inc., Wakefield, MA (US)

(72) Inventors: Edward F. Hardebeck, Brookline, MA (US); Deborah Mendez, Arlington, MA (US); Richard L. Baker, Belmont, MA (US); Tom Martin, Portsmouth, NH (US)

(73) Assignee: Glance Networks, Inc., Wakefield, MA (US)

( * ) Notice: Subject to any disclaimer, the term of this patent is extended or adjusted under 35 U.S.C. 154(b) by 0 days.

(21) Appl. No.: 16/998,572

(22) Filed: Aug. 20, 2020

(65) Prior Publication Data

US 2021/0029247 A1    Jan. 28, 2021

Related U.S. Application Data

(62) Division of application No. 16/388,446, filed on Apr. 18, 2019, now Pat. No. 10,757,258.

(60) Provisional application No. 62/670,744, filed on May 12, 2018.

(51) Int. Cl.
*H04M 3/51* (2006.01)
*H04L 29/06* (2006.01)

(52) U.S. Cl.
CPC ...... *H04M 3/5183* (2013.01); *H04L 65/1076* (2013.01); *H04L 65/1096* (2013.01)

(58) Field of Classification Search
CPC combination set(s) only.
See application file for complete search history.

(56) References Cited

U.S. PATENT DOCUMENTS

| | | | | |
|---|---|---|---|---|
| 2015/0149557 A1* | 5/2015 | Mendez | ............... | G06F 40/143 709/205 |
| 2015/0256677 A1* | 9/2015 | Konig | ................ | H04M 3/5233 379/265.09 |
| 2016/0044163 A1* | 2/2016 | Jiang | ................ | H04M 3/42042 379/142.06 |
| 2016/0381091 A1* | 12/2016 | O'Connor | ........... | H04L 65/1089 370/260 |
| 2017/0013073 A1* | 1/2017 | Mendez | ................ | G06F 16/954 |

(Continued)

*Primary Examiner* — Phung-Hoang J Nguyen
(74) *Attorney, Agent, or Firm* — Anderson Gorecki LLP

(57) ABSTRACT

A method and apparatus for visual engagement using automatically dynamically selected visualization mediums is described that will allow visual engagement via visual engagement sessions between customers and agents regardless of the type of application in use at the customer. Calls between customers and agents are implemented using the Public Switched Telephone Network (PSTN) or Voice over Internet Protocol (VoIP), and visual engagement sessions are added to the calls, which enables visual engagement to occur without requiring modification of the manner in which calls are handled (routed) and bridged at the call center. In some embodiments, to enable an agent to see an output of an application client in use by a customer, a visualization system automatically selects one or more types of visualization technology for a visualization session with the customer based on the type of application client in use at the customer.

20 Claims, 10 Drawing Sheets

(56) References Cited

U.S. PATENT DOCUMENTS

2017/0070607 A1* 3/2017 Kadosh .............. G06Q 10/1097
2017/0280494 A1* 9/2017 Jung ..................... H04N 7/147

* cited by examiner

VISUAL ENGAGEMENT USING AUTOMATICALLY DYNAMICALLY SELECTED VISUALIZATION MEDIUMS

CROSS REFERENCE TO RELATED APPLICATIONS

This application is a divisional application of U.S. patent application Ser. No. 16/388,446, filed Apr. 18, 2019, which claims priority to U.S. Provisional Patent Application No. 62/670,744, filed May 12, 2018, entitled Visual Engagement Using Automatically Dynamically Selected Visualization Mediums, the content of each of which is hereby incorporated herein by reference.

COPYRIGHT

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND

End user applications, such as financial services software, that are designed to provide particular functionality, may be implemented in many different ways. For example, on a mobile device 120 such as a smartphone or tablet computer, the application may be accessed over the Internet using a browser on the mobile device 120. Alternatively, the application may be implemented either as a native application 122A or as a hybrid application 122B. A native application 122A is an application having a Graphical User Interface (GUI 202) designed to run in the context of the operating system of the mobile device 120.

In some embodiments, hybrid mobile application 122B includes a native layer implemented as an executable object compiled for execution on a particular computing platform. For example, the native layer can be compiled or built for execution on mobile device 120 (e.g., built for the operating system, processor, chipset, etc.) or devices having a similar configuration as mobile device 120. Because the native layer is built to run on mobile device 120, the native layer of hybrid application 122B has access to system functions and features of the mobile device 120. Example system functions may include the mobile device native phone function, camera, sensors, GPS, etc. In some embodiments, hybrid application 122B also includes an embedded browser and the native layer serves as a container for the embedded browser. Thus, the embedded browser can read, interpret, compile, and/or execute web code and/or technologies, such as HTML, JavaScript, cascading style sheets, etc., to generate graphical user interfaces, communicate with web servers, and perform other web client functions. The specific functionality of the embedded browser depends on the web code loaded by the embedded browser. Because hybrid applications 122B use an embedded browser to implement some of the application functionality, hybrid applications tend to be easier to extend to multiple computer platforms.

For laptop computers, desktop computers, and other types of computing devices (collectively computers 124), the application likewise may have a GUI 202 that is designed to run in the context of the computer's operating system, or may provide application output using a browser 210 running on the computing device. In some instances, the application is a stand-alone application 126A that is installed on the computer 124 and executes in the context of an operating system that is controlling the basic operating functions of computer 124 and the application 126A. In other instances, an application client is installed on the computer 124 and interacts with an application server 150, such that execution of the application is split between the locally installed client and the application server 150. In other instances, a web browser 210 is used on the computer 124 to access a web server 150 hosting the application 152, and script downloaded to the browser 210 is used to process information received from the application server 150 and interact with the application server 150. There therefore are many ways that applications may be designed to execute to provide desired functionality.

Regardless of how the application is designed to operate, when a user is having trouble interacting with the application, the user may desire to obtain help from a live agent 130.

Accordingly, application providers often provide call center 140s 140 staffed with agents 130, supervisors 132, and other personnel, to receive and respond to calls and text-based chat requests from customers. For example, if a customer 115 is using a Software as a Service (SaaS) application, and is unsure which aspect of the SaaS application should be used to perform a desired function, the customer 115 may want to talk or chat (text) with an agent 130 that has been trained to use the SaaS application.

As used herein, the term "customer" will be used to refer to the person using the application and the term "agent" will be used to refer to the person at the call center 140 that picks up the call from the customer or that assumes responsibility for a text-based dialog with the customer. Where the agent is a live person, the live agent may be working at a call center 140 or may be an independent person affiliated with the call center 140. In some embodiments, the "live agent" may initially be an automated response mechanism, such as an Artificial Intelligent (AI) bot to provide computer generated customer support. In some embodiments, the agent may initially be an automated response mechanism, and may change to a live person during the course of the interaction with the customer 115. The terms "customer" and "agent" will also be used herein to refer to the respective computing devices in use by each of the participants to a visualization session between the customer and agent. Thus, for example, the term "customer" may refer to the live person running the application or to the computing device being used by the live person to execute the application depending on the context. Likewise, the term "agent" may refer to the live person or AI bot at the call center 140, or to the computing device being used by the live person at the call center 140, depending on the context. Where the context indicates that computer generated messages are being passed between various computer components shown in FIG. 1, the respective terms "customer" and "agent" are being used to refer to the computing devices in use by the respective live persons, or between the computing device in use by the customer person and the AI bot.

Agents 130 are often tasked with helping a large number of people. Accordingly, reducing the amount of time an agent 130 takes to assist a customer 115 is desirable, since doing so enables the agent 130 to assist a larger number of customers 115 to reduce the possibility that a customer 115 requiring assistance is unable to obtain access to an agent 130. Likewise, enhancing the agent's 130 ability to provide accurate advice in a timely manner is paramount, so reducing the amount of time the agent 130 spends trying to ascertain the nature of the customer's 115 problem and guide the customer to its resolution can greatly increase agent 130 productivity and decrease customer 115 frustration with the application and with the call center 140.

One approach to enabling agents 130 to provide enhanced service to customers 115 is to use WebRTC to enable agents to see the customer's 115 view of the application 122, 126, so that the agent 130 can more quickly ascertain why the customer 115 is seeking help.

WebRTC uses a peer-to-peer protocol. To establish an audio/video WebRTC call, a first peer-to-peer connection is established between the customer 115 and agent 130 to transmit audio, and a second, separate, peer-to-peer connection is established between the customer 115 and agent 130 to enable the agent to see the customer's application screen. Where the agent is also going to show video to the customer 115, such as where a webcam is to be used to provide the customer 115 with a live view of the agent 130, a third peer-to-peer connection is required to be established. While it may be possible, in some instances, to bundle the media streams of the peer-to-peer connections for common transportation across the communication network 105 depending on the capabilities of the endpoints, not all endpoints necessarily support bundling of this nature. Further, adding a media stream to an existing peer-to-peer connection may not be possible, depending on how the WebRTC standard develops over time. Thus, implementation of multiple peer-to-peer connections may require not only separate signaling to take place between the endpoints on the network, but also may require separate transport paths to be built through the communication network 105 to handle the separate media streams between the endpoints.

Unfortunately, the use of WebRTC has several drawbacks. A first drawback to using WebRTC is that, since a WebRTC call is not a conventional telephone call, such as a call on the Public Switched Telephone Network (PSTN) or a Voice over Internet Protocol (VoIP) voice call, the WebRTC call may require special routing to be implemented at the call center 140. Specifically, most of today's enterprise call center 140s would need to make substantial investments to implement the call routing infrastructure needed to manage and direct each WebRTC call to the appropriate agent 130. The call center 140 would need to acquire or lease new telecommunications equipment, modify its network infrastructure to accommodate WebRTC protocols, as well as design, configure and test business rules to route the WebRTC calls. For a large call center 140, the cost of these modifications could easily exceed seven figures in dollars.

Another drawback to using WebRTC is that configuring the call center 140 to handle both today's voice calls as well as new WebRTC calls may require the call center 140 to set aside a dedicated group of agents 130 just for the WebRTC calls. Since WebRTC calls require the use of a non-telephony endpoint to interact with the calls, if an agent 130 is required to handle both normal voice calls and WebRTC calls, the agent 130 may need to physically change headsets depending on the type of call.

Yet another drawback to using WebRTC is that, since the WebRTC call is essentially a video phone call from a web browser 210, and not all browsers 210 universally support WebRTC, the solution is far from ubiquitous. Even if the customer's browser 210 supports WebRTC, the likelihood of the call being successful can be compromised by the fact that its peer-to-peer signaling mechanism can experience an unacceptably high failure rate traversing firewalls at the customer's location.

Still another drawback to using WebRTC is that it becomes difficult to escalate the WebRTC call, transfer the WebRTC call, or otherwise allow supervisors 132 or other higher-tier people at the call center 140 to join the call or to interact with the WebRTC call. Specifically, as noted above, WebRTC is a peer-to-peer protocol which means that the WebRTC call is a set of peer-to-peer communication sessions between the customer 115 and the agent 130. Thus, for example if the agent 130 wants to introduce the customer to another agent within the call center 140 (a warm transfer), a second set of peer-to-peer communication sessions will need to be established between the first agent and the second agent, and a third set of peer-to-peer communication sessions will need to be established between the second agent and the customer. Thus, to perform the transfer, a fully connected mesh of peer-to-peer connections must be established. If a fourth person is to be added, such as an additional supervisor, the number of peer-to-peer connection increases accordingly. Since some browsers today, possibly other than the Google Chrome browser, are unlikely to be able to sustain even two simultaneous WebRTC connections, the use of WebRTC can limit the manner in which the call center 140 is able to interact with customers 115.

Alternatively, 2-way WebRTC calls that need to escalate to multi-way could be re-routed to a bridge, where each participant connects directly (peer-to-peer) to the bridge. The bridge itself adds extra expense, and to ensure its availability, a call center 140 would typically need to deploy and maintain at least two such bridges, possibly at each call center 140 location. This, once again, increases the cost for a call center 140 to use WebRTC as a basis for implementing visual engagement with its customers 115.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A method and apparatus for visual engagement using automatically dynamically selected visualization mediums is described that will allow visual engagement via visual engagement sessions between customers and agents regardless of the type of application in use at the customer. Calls between customers and agents are implemented using the Public Switched Telephone Network (PSTN) or Voice over Internet Protocol (VoIP), and visual engagement sessions are added to the calls, which enables visual engagement to occur without requiring modification of the manner in which calls are handled (routed) and bridged at the call center 140. In some embodiments, to enable an agent to see an output of an application client in use by a customer, a visualization system 110 automatically selects one or more types of visualization technology for a visualization session with the customer based on the type of application client in use at the customer.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
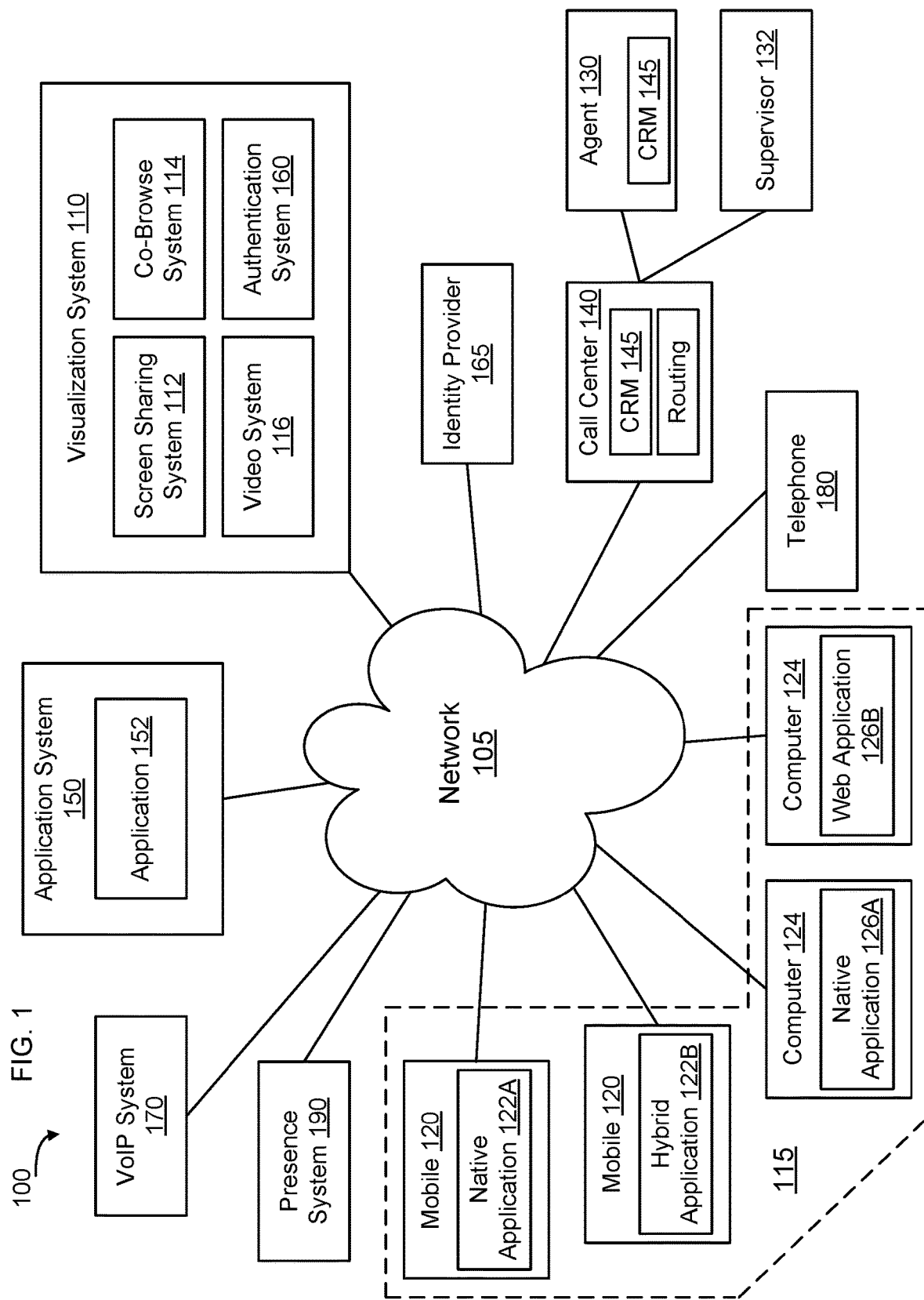
FIG. 1 is a functional block diagram of a set of networked components for visual engagement using automatically dynamically selected visualization mediums according to some embodiments.

A method and apparatus for visual engagement using automatically dynamically selected visualization mediums is described that will allow visual engagement via visual engagement sessions between customers 115 and agents 130 regardless of the type of application in use at the customer 115. Calls between customers 115 and agents 130 are implemented using the Public Switched Telephone Network (PSTN) or Voice over Internet Protocol (VoIP), and visual engagement sessions are added to the calls, which enables visual engagement to occur without requiring modification of the manner in which calls are handled (routed) and bridged at a call center 140. In some embodiments, to enable an agent 130 to see an output of an application client 122, 126 in use by a customer 115, a visualization system 110 automatically selects one or more types of visualization technology for a visualization session with the customer 115 based on the type of application client 122, 126 in use at the customer 115.

The functionality of the underlying computer systems at the customer 115, agent 130, visualization system 110, and other components described herein are improved to automatically select the correct type of visualization technology for a given visualization session. In particular, by modifying the operation of the underlying computer technology to enable the visualization system 110 to automatically select between multiple different types of visualization technologies, the computer systems are able to provide visual engagement between an agent 130 and multiple customers 115 using multiple different types of application clients 122, 126, without requiring the agent 130 to know before-hand what type of application client 122, 126 is in use by a given customer 115 and without requiring the agent 130 to understand or select the type of visualization technology to be used to implement the visualization sessions with the various customers 115.

FIG. 1 is a functional block diagram of a visual engagement system 100 including a set of networked components for visual engagement using automatically dynamically selected visualization mediums according to some embodiments. The components of the visual engagement system 100 are interconnected by communication network 105 which, in some embodiments, is the Internet. As shown in FIG. 1, in some embodiments the visual engagement system 100 includes a visualization system 110 including one or more physical or virtual servers designed to implement multiple types of visual engagement sessions between customers 115 and agents 130 at a call center 140. While FIG. 1 shows agent 130 directly connected to call center 140, in some embodiments agents 130 are connected to call center 140 over communication network 105.

As shown in FIG. 1, customers 115 may use multiple types of devices to run applications and to contact the call center 140. For example, a first customer 115 may be using a mobile device 120 running a native application 122A. A second customer 115 may be using a mobile device 120 running a hybrid application 122B or a web application 126B.

A third customer 115 may be using a laptop or desktop computer 124 running a native application 126A. A fourth customer 115 may be using a computer 124 running a web application 126B or a hybrid application 122B.

As shown in FIG. 1, in some embodiments the visual engagement system 100 includes an application system 150 comprising one or more physical or virtual servers hosting application 152 to interact with applications 122A, 122B, 126A, 126B. In some embodiments, the call center 140 is affiliated with the application system 150. For example, a company that owns or operates the application system 150 may own the call center 140 to provide customer support for its customers 115. In some embodiments, the call center 140 is affiliated with the application 152. For example, the company that owns or operates the application 152 hosted by application system 150 may own the call center 140 to provide customer support for its customers 115. In other embodiments the application system 150 and/or application 152 provider and call center 140 are unaffiliated, and the application system 150 and/or application 152 provider contracts with the call center 140 to provide customer support for customers 115. In some embodiments, the agent 130 is a partner or affiliate of the company owning application system 150. The company may grant privilege for that "partner agent" 130 to use visualization system 110 to visually engage customers 115.

As described in greater detail herein, in some embodiments the visualization system 110 includes a screen sharing system 112, co-browse system 114, and video system 116. The visualization system 110 may further include an authentication system 160 or optionally a separate authentication system 160 may be utilized. In some embodiments, authentication system 160 is implemented using Security Assertion Markup Language 2.0 (SAML 2.0), which is a standard for exchanging authentication and authorization data between security domains. In such cases, Authentication System 160 would typically be a service provided by an entity that is independent of Visualization system 110. SAML 2.0 is an XML-based protocol that uses security tokens containing assertions to pass information about a principal (i.e. agent 130) between a SAML authority, referred to in the standard as an Identity Provider (La authentication system 160), and a SAML consumer, referred to in the standard as a Service Provider (i.e. visualization system 110). SAML 2.0 enables web-based, cross-domain single sign-on (SSO), which helps reduce the administrative overhead of distributing multiple authentication tokens to the user.

In some embodiments, screen sharing system 112 may include one or more servers configured to implement visualization sessions using "screen sharing technology," in which information displayed on a screen of the mobile device 120 or computer 124 is captured and transmitted on the network 105. One example screen sharing system 112 is described in greater detail in U.S. Pat. No. 8,484,291, entitled Method and Apparatus for Selecting Commands for Transmission from an Update Queue, the content of which is hereby incorporated herein by reference. Because screen share technology captures the content of the customer's screen, it can capture information shown inside a browser as well as information shown on the customer's screen outside of the browser.

In some embodiments, co-browse system 114 may include one or more servers configured to implement visualization sessions using "co-browsing technology," in which the document object model (DOM) defining how information is displayed in a browser 210 is captured and transmitted on the network 105. One example co-browse system 114 is described in greater detail in U.S. Pat. No. 9,736,214, entitled Integrating Co-Browsing with Other Forms of Information Sharing, the content of which is hereby incorporated herein by reference. Because co-browse technology enables the agent 130 to replicate the DOM of the customer's browser, co-browse technology is limited to only transmitting information that is shown within the customer's browser 210.

As discussed in greater detail in U.S. Pat. No. 9,736,214, one advantage of using co-browsing technology is that co-browsing enables particular elements that appear in the customer's browser 210 to be masked and not transmitted to the agent 130. Thus, co-browsing enables a list of masked fields to be specified, to prevent information associated with those fields from leaving the customer's browser 210. Masking a field may be implemented, for example, on an HTML input element by preserving the HTML element on the agent 130 side while preventing the customer 115 from transmitting the state or content of that element to the agent 130 over the co-browse session. Since the application may have sensitive customer 115 information that is not relevant to the agent 130, by using a co-browse technology to transmit information displayed in the browser 210 that uses a method which is aware of the structure of the rendered page, it is possible to accurately implement masking at the customer 115. This improves security on the visualization session, because sensitive (masked) data never touches the visualization session, and thus, never reaches the agent 130.

One advantage of using co-browsing technology, therefore, is that since co-browse masking involves the use of JavaScript loaded at the customer browser to hide the content of portions of the browser content identified with particular CSS selectors, the entity responsible for the content of the browser (i.e. the website or application provider) does not need to modify the website/interface to enable masking to take place. Although masking using screen-sharing technology is possible, in some instances it can be difficult to identify which regions should be masked. While it is possible to identify regions to be masked by causing those regions to be rendered with a slightly different color, doing so requires the website/interface to be modified, which is thus more difficult for the application provider to implement. Co-browse technology also is much faster, has a much lower data rate, and can render objects at optimal resolution, compared to screen share technology, including animated web elements and popup elements.

As discussed herein, a hybrid application includes a native layer and a browser. In some embodiments, the hybrid application accordingly may have a first portion of its display that includes native elements and a second portion of its display that is shown in a browser. In some embodiments, screen sharing is used to show the portion of the display that includes the native elements and co-browse technology is used to show the portion of the display that includes the browser. Where the native elements do not need to be masked, this enables co-browse masking to be utilized to prevent transmission of sensitive information on the visualization session. In other embodiments, screen sharing is used to capture the entire display of the hybrid application—both the native portion and the browser-based portion.

In some embodiments, the visualization system 110 enables visual engagement between the customers 115 and agents 130 by automatically selecting the use of a screen sharing technology to show an agent 130 the portions of the customer's display that are implemented natively on the customer's device, and automatically selecting the use of a co-browsing technology to show the agent 130 the portions of the customer's display that are implemented using a browser 210 on the customer's device. In some embodiments, where a portion of the display is implemented natively and another portion is implemented using a browser 210, the visualization system 110 selects a blend of visualization technologies to implement the visualization session for the customer 115. The video system 116 is used to show still pictures, live video, a live view of the agent's mobile device(s), or agent 130 selected video from the agent 130 to the customer 115, or to show still pictures or live video from the customer 115 to the agent 130. Although an embodiment will be described in which screen sharing, co-browsing, and video are implemented using technologies other than WebRTC, in some embodiments WebRTC is used to implement some of the functions of visualization system 110.

In addition to enabling the agent 130 to see what the customer 115 is seeing, the agent 130 and customer 115 often will want to communicate by text message or by voice call. To facilitate this type of communication, for mobile devices 120, in some embodiments a Voice over Internet Protocol (VoIP) system 170 is provided to enable the temporary activation of the VoIP SDK and temporary assignment of telephone numbers or telephone number extensions to mobile devices 120 seeking to contact the call center 140.

Customers 115 can likewise contact the call center 140 using a telephone 180 which may be connected to the Public Switched Telephone Network (PSTN), or other communication network 105. For example, customers 115 associated with computers 124 may elect to place a telephone call to the call center 140 using a normal telephone, a telephony client installed in their computer 124, or the telephony application of their smartphone or other mobile device.

In some embodiments, a presence system 190 is provided to obtain information about customers 115 as the customers 115 interact with the application system 150, VoIP system 170, call center 140, and visualization system 110, to allow call center 140 or agent 130 to proactively initiate a visualization session with the customer 115, or to facilitate associating visualization sessions of the visualization system 110 with telephone calls from the customers 115 to the call center 140.

Figure 2:
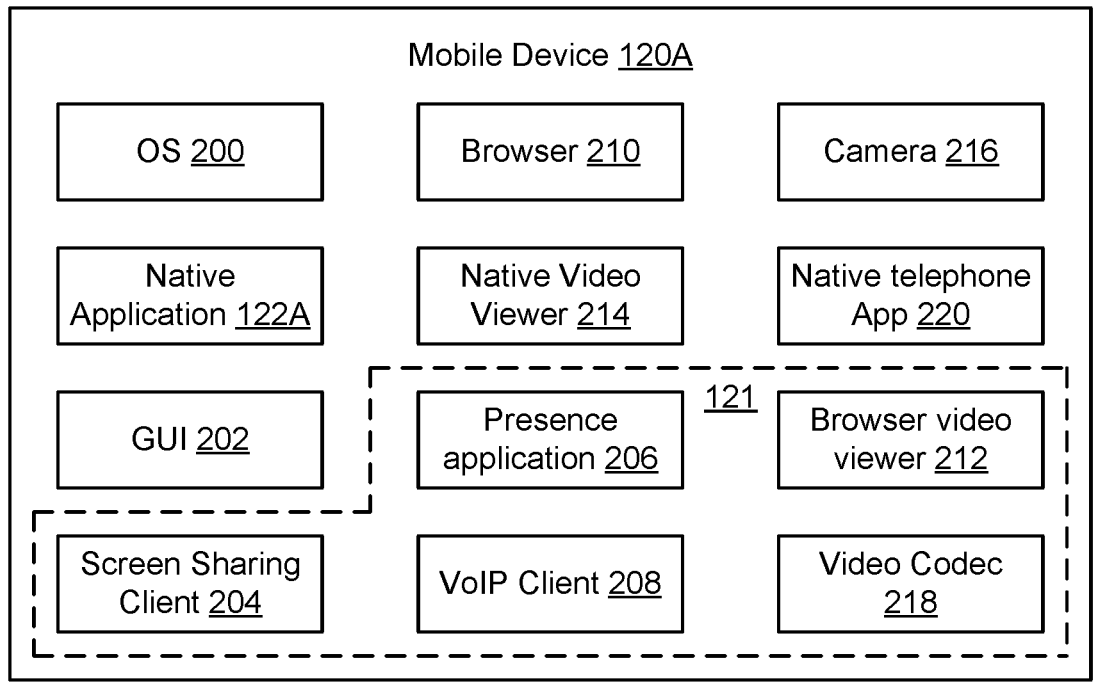
FIGS. 2 and 3 are functional block diagrams of example mobile devices configured to interact with the set of networked components of FIG. 1 according to some embodiments.
Figure 3:
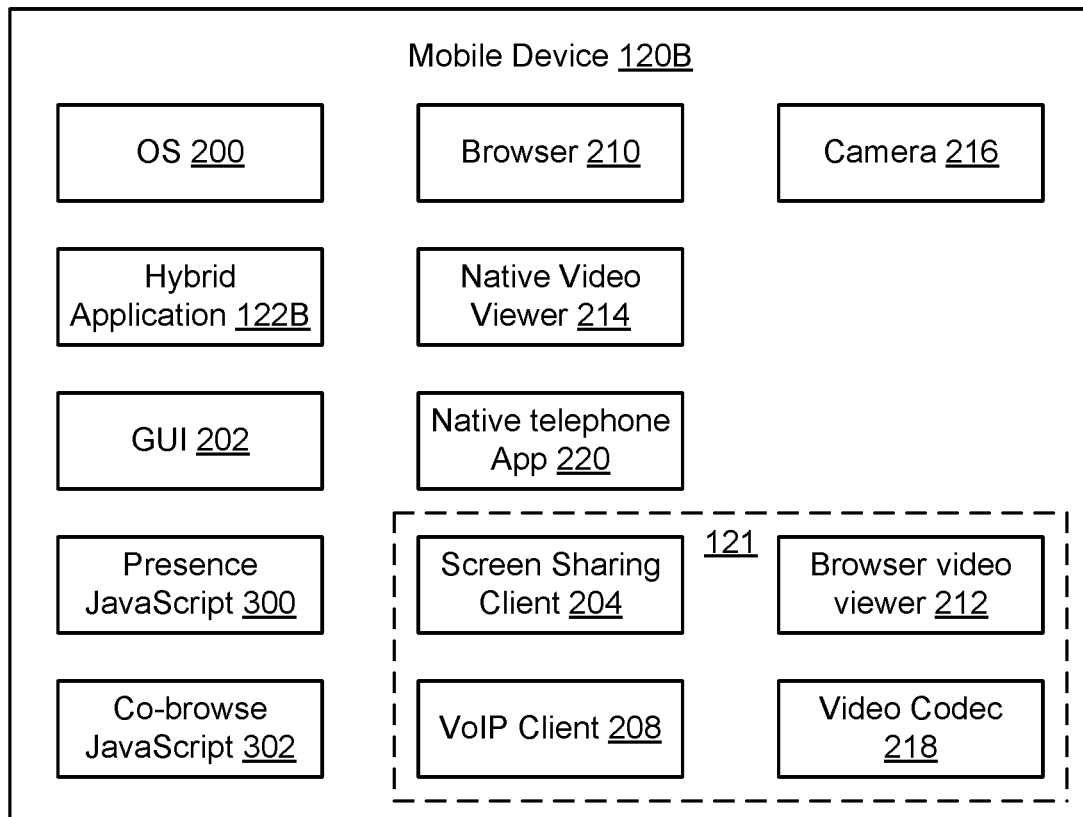

FIGS. 2 and 3 are functional block diagrams of example mobile devices 120 configured to interact with a system providing visual engagement using automatically dynamically selected visualization mediums according to some embodiments. One difference between FIG. 2 and FIG. 3 is that FIG. 2 shows a mobile device 120A having a native application 122A and FIG. 3 shows a mobile device 120B having a hybrid application 122B. Many of the components of the mobile devices 120 shown in FIGS. 2 and 3 are similar or identical.

Figure 12:
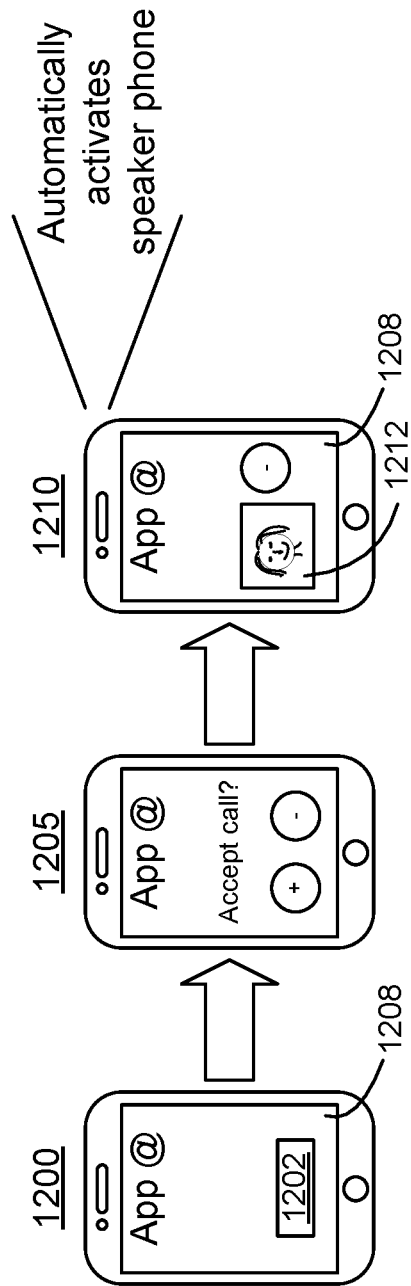
FIG. 12 is a flow diagram of a process for making a telephone call on a mobile device while working with another application on the mobile device according to some embodiments.
Figure 13:
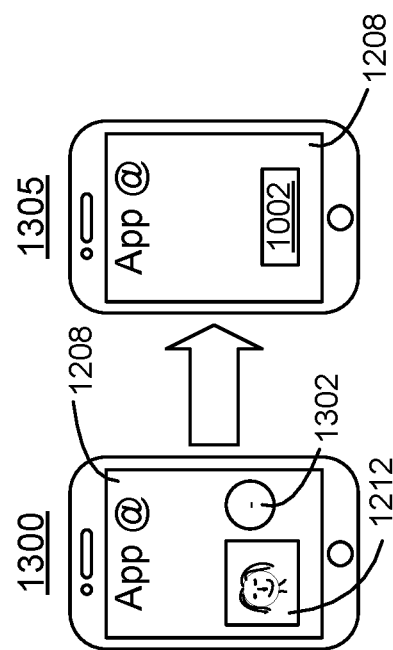
FIG. 13 is a flow diagram of a process for ending a telephone call on a mobile device while working with another application on the mobile device according to some embodiments.

As shown in FIG. 2, mobile device 120A includes an operating system 200. Native application 122A is loaded into memory on the mobile device 120 and runs in the context of the operating system 200. Native application 122A is built to operate on the operating system 200 and has access to all the capabilities of the device, such as the network 105, camera 216, motion sensors, proximity sensors, GPS, native telephone function 220, etc. The native application 122A has a GUI 202 that is implemented using calls to the operating system 200 to generate the displayed elements of the GUI 202. The GUI 202 is shown on a screen of a mobile device 120, such as a touch sensitive screen. An example screen of a mobile device 120 displaying an application 122 is shown in FIGS. 12-13. To enable information displayed on the screen of the mobile device 120 to be captured and transmitted on a visualization session, the mobile device 120 includes a screen sharing client 204 configured to interact with the screen sharing system 112. In some embodiments, screen sharing client 204 is incorporated into native application 122A. In some embodiments, screen sharing client 204 is constrained to show application 122. In other embodiments, the screen sharing client 204 is configured to show the mobile device's entire screen or other (possibly whitelisted) applications running on the device 120A.

In some embodiments, mobile device 120A includes presence client 206 and VoIP client 208. Presence client 206 posts identifying information to presence system 190 and VoIP client 208 interacts with VoIP system 170 to obtain temporary assignment of a telephone number or temporary assignment of an extension associated with a telephone number, for use in connection with a VoIP call to the call center 140. In some embodiments, the VoIP client 208 provides the temporarily assigned telephone number or extension to the presence client 206, so that the presence client 206 can post the assigned telephone number or extension to the presence system 190. In some embodiments, when the call is connected to the call center 140, the call center 140 uses the assigned VoIP telephone number or extension to poll the presence system 190 for identifying information about the customer 115, and uses the identifying information and call center 140 business rules to route the call to the best agent 130 to handle the call.

Use of a VoIP client 208 to enable the native application 122A to make a voice call over a data connection can be advantageous, for example where the mobile device is connected to a 3G or other mobile network that does not support simultaneous voice and data connections, or where the customer 115 is using a tablet computer or other device that does not have a telephony client. Presence application 206 and VoIP client 208 may be packaged with screen sharing client 204 as visualization software 121 which may be separate from or integrated into native application 122A.

Mobile device 120A may include a browser 210 with a browser video viewer 212. Optionally, a native video viewer application 214 may also be loaded to the mobile device 120 in connection with installation of the native application 122A. Browser video viewer 212 is provided to enable video received from video system 116 to be displayed on mobile device 120 within browser 210. Native video viewer application 214 is provided to enable video received from 116 to be displayed natively within application 122A. In some embodiments mobile device 120 includes a native or a browser-based screen sharing viewer, either as a stand-alone application or as part of screen-sharing client 204, to enable the mobile device to display screen share information from the agent 130.

Mobile device 120A includes camera 216 configured to take still pictures and live video. In some embodiments the mobile device 120A includes a video codec 218 to enable live video received from the camera 216 to be encoded for low latency transmission on the communication network 105 to the video system 116. Video codec 218 may be native to the mobile device 120A or included as part of visualization software 121. The mobile device 120A may have numerous other components, such as native telephone application 220.

In some implementations, the screen sharing client 204, presence client 206, VoIP client 208, browser video viewer 212, and video codec 218 are implemented as visualization software 121 that is downloaded to the mobile device 120 as part of the visualization software development kit shown in FIG. 6, described below, often as part of native application 122. In some embodiments, video codec 218 is native to the mobile device 102A and not required to be downloaded to the mobile device 102A as part of visualization software 121. Alternatively, in some embodiments portions of visualization software 121 are downloaded as needed.

As shown in FIG. 3, a mobile device 120B configured to execute a hybrid application 122B has many of the same components as the mobile device 120A configured to implement a native application 122A. As noted above, a hybrid application 122B has an embedded browser 210. Accordingly, JavaScript running in the browser 210 can be used to implement some of the functions of the components described above in connection with FIG. 2. Depending on the implementation, presence application 206 can be downloaded to the mobile device as part of visualization software 121 or the functions of presence application 206 can be implemented using presence JavaScript 300 loaded to browser 210.

In some embodiments, co-browse JavaScript 302 is used to capture information shown on browser 210 and transmit the browser 210 information to the co-browse system 114. In some embodiments, the mobile device 120 also includes a screen sharing client 204. In some embodiments, the screen sharing client captures the entire output of the application shown on the mobile device's display, captures only the natively displayed aspects of the application, or captures the entire display of the mobile device 120B, and transmits the captured screen sharing information to the screen sharing system 112 during a visualization session. A visualization session of the output of a hybrid application 122B thus may include two or more different visualization technologies: screen-share technology may be used to capture and transmit natively rendered aspects of the display and co-browse technology may be used to capture and transmit the content of embedded browser 210. Sensitive information displayed by native elements would be masked by the screen-share technology, while sensitive information contained in elements rendered by the embedded browser 210 would be masked by the co-browse technology.

The mobile device 120B may include numerous other components, such as browser 210 and native video viewer application 214. In some implementations, the screen sharing client 204, VoIP client 208, browser video viewer 212, and video codec 218, are implemented as visualization software 121 that is downloaded to the mobile device 120 as part of the visualization software development kit shown in FIG. 6, described below. Alternatively, in some embodiments portions of visualization software 121 are downloaded as needed. In some embodiments, co-browse JavaScript 302 and/or presence JavaScript 300 are loaded to browser 210 in connection with loading application 122. In some embodiments, co-browse JavaScript 302 and/or presence JavaScript 300 are loaded to browser 210 from visualization system 110. Optionally, where other components of visualization software 121 are implemented using JavaScript those components may also be loaded to browser 210.

Figure 4:
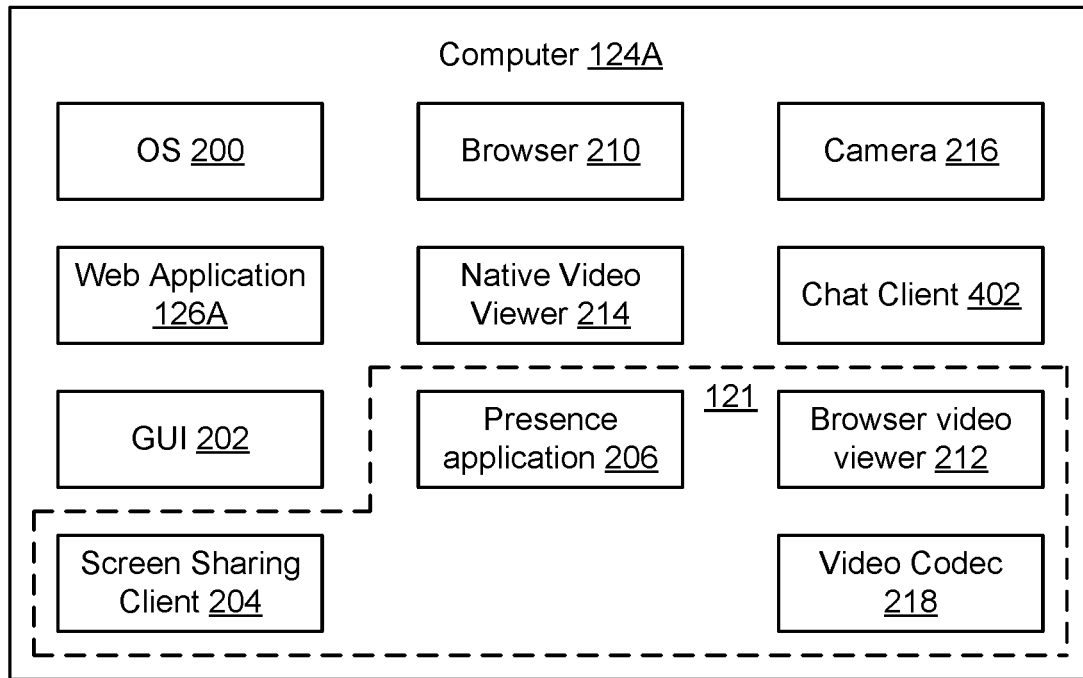
FIGS. 4 and 5 are functional block diagrams of example computers configured to interact with the set of networked components of FIG. 1 according to some embodiments.
Figure 5:
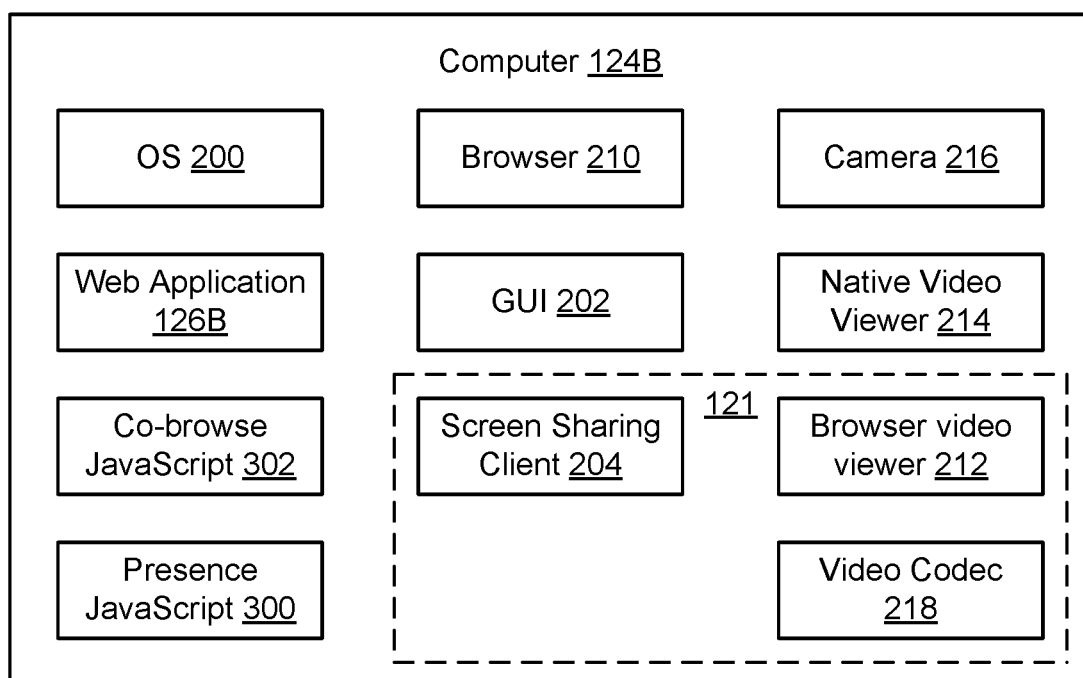

FIGS. 4 and 5 are functional block diagrams of example computers 124 configured to interact with a system providing visual engagement using automatically dynamically selected visualization mediums according to some embodiments. One difference between FIG. 4 and FIG. 5 is that FIG. 4 shows a computer 124A having a native application 126A and FIG. 5 shows a computer 124B having a web application 126B. Many of the components of the computers 124A, 124B shown in FIGS. 4 and 5 are similar or identical to the components discussed above in connection with FIGS. 2 and 3. Of course, differences in operating systems and computer platforms may require the components such as the application and browser to be optimized for the particular platform. Additionally, FIG. 4 shows an implementation in which the computer 124A includes a chat client 402. Any of the devices described in connection with FIGS. 2-5 may include a chat client 402. Chat client 402 may be a native messaging application or a soft chat client downloaded to run in the context of the application 122, 126 instantiated on the device, or as a soft client within the web browser 210.

Figure 6:
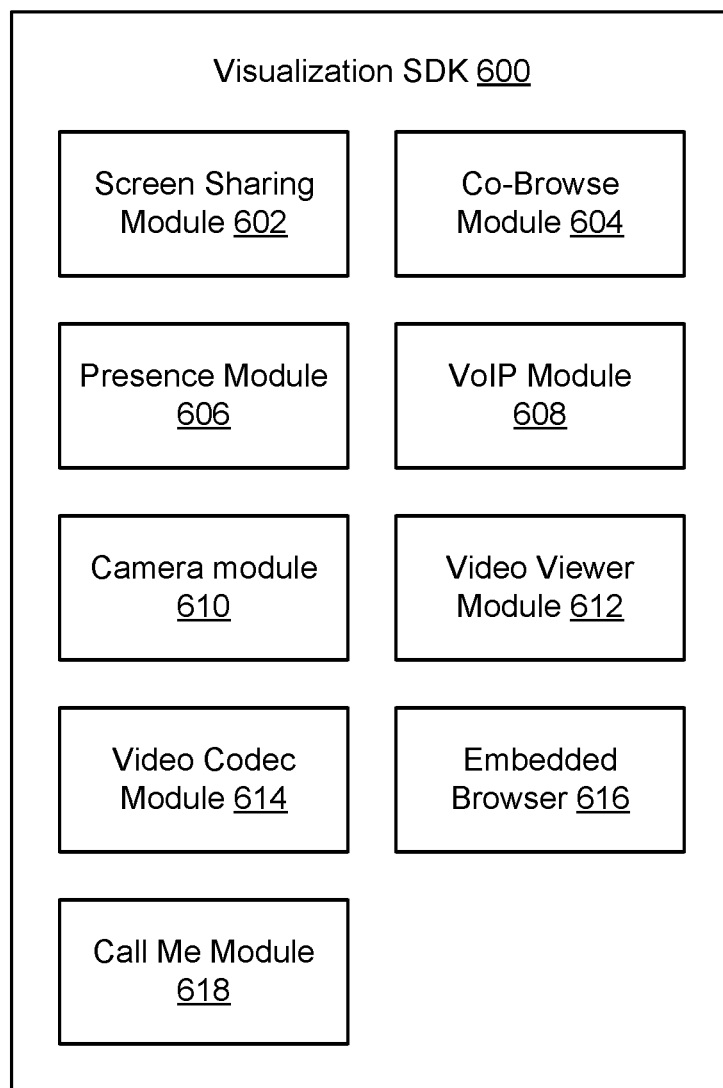
FIG. 6 is a functional block diagram of a set of software tools for inclusion in an application to enable the application to interact with a system providing visual engagement using automatically dynamically selected visualization mediums according to some embodiments.

FIG. 6 shows an example set of software tools that may be used by application developers to incorporate visualization functionality into their applications. As shown in FIG. 6, in some embodiments the set of software tools is implemented as a visualization Software Development Kit (SDK) 600. The SDK, in some embodiments, includes a screen sharing module 602, a co-browse module 604, a presence module 606, and VoIP module 608. In some embodiments the VoIP module 608 is implemented as a VoIP SDK received from VoIP system 170. As noted above, the co-browse module 604 and presence module 606, in some embodiments, may be implemented using JavaScript. In some embodiments the SDK further includes a camera module 610 for interacting with the device' camera function, a video viewer module 612 for enabling agent video to be displayed, a video codec module 614 to enable customer video to be captured and forwarded to the visualization system 110, and an embedded browser 616.

In some embodiments, a call-me module 618 is provided in the visualization SDK. In some embodiments, the call-me module 618 enables a customer 115 to elect to transmit identifying information such as the customer's phone number, temporarily assigned VoIP telephone number/extension, IP address, SIP address, or other identifying information to both the presence system 190 and to the call center 140. The identifying information may be passed over the VoIP network as a text message, may be passed as a standard text message over a cellular network, may be passed as an email, or other electronic message.

When the message is received at the call center 140, the call is routed to an agent 130 best suited for the call. In some embodiments, the call center 140 uses the temporarily assigned telephone number or other telephone number associated with the customer 115 to poll the presence system 190 for information about the customer 115, and uses the information about the customer 115 as well as the telephone number to route the call to an agent 130 that is best equipped to handle the interaction with the customer 115. When an agent 130 elects to contact the customer 115, the agent 130 places an outbound call to the customer 115 using the identifying information. The call center 140 likewise initiates contact with the visualization system 110 to provide the visualization system 110 with the identifying information of the customer 115, and instructs the visualization system 110 to initiate a visualization session between the designated agent 130 and the identified customer 115.

The visualization system 110 contacts the presence system 190, which matches the customer identifying information in the visualization session request from the call center 140 with identifying information received from the customer 115 when the call-me module 618 was initialized, to determine the type of visualization session to be used for this customer 115. The presence system 190 passes the visualization mode as well as the customer identifying information to the visualization system 110. The visualization system 110 establishes the visualization session between the agent 130 and the customer 115 so that when the audio call between the agent 130 and customer 115 is established the agent 130 can see the customer's view of the application 122, 126.

Regardless of how the customer 115 is using an application 122, 126, when customer 115 seeks help by contacting the call center 140, it would be desirable to enable the agent 130 at the call center 140 to see the current display of the application as seen by the customer 115. According to some embodiments, when a customer 115 contacts the call center 140, a visualization session is initiated with the customer 115. Information required to start the visualization session may come from multiple sources. When the call center 140 contact event occurs through a feature of the application interface, in some implementations application system 150 provides information to the visualization system 110 about the customer 115 as well as information about the type of application being used by the customer 115 so that the visualization system 110 knows who should be included in the visualization session and which type of technology (screen sharing, co-browsing, both, and optionally also video) should be used to implement the visualization session.

When the call center 140 contact event occurs through a voice application interface feature available through the application GUI 202, for example if the customer 115 initiates a VoIP call via the application interface, in some embodiments the VoIP system 170 provides the visualization system 110 with the telephone number or telephone number plus extension that the VoIP system 170 has temporarily assigned to the customer 115, as well as information about the type of application being used by the customer 115, so that the visualization system 110 knows which phone call is associated with the visualization session and also knows which type of technology (screen sharing, co-browsing, both, and optionally also video) should be used to implement the visualization session.

When the call center 140 contact event occurs through an external entity, such as through telephone 180, in some embodiments the visualization system 110 or CRM system 145 uses the available information from the CRM, the telephone system, such as the originating number of the telephone 180 or other identifying information supplied by the customer 115 on the telephone call, to interrogate the presence system 190. Based on information from the presence system 190, the visualization system 110 attempts to match mobile device 120 or computer 124 with the call center 140 contact event to match a visualization session with the telephone call, and to also determine which type of technology (screen sharing, co-browsing, both, and optionally also video) should be used to implement the visualization session.

Providing security on visualization sessions is extremely important. For example, where a customer 115 is using financial services software, the customer 115 needs to be assured that any visualization session that occurs is not able to be viewed by third parties on the communication network 105. In some embodiments, all visualization sessions are started by the entity that will show information on the visualization session. Thus, if a customer 115 is to show information on the visualization session, the customer 115 will start the session. Where an agent 130 is going to show information back on the visualization session, e.g. via a sub-session, the agent 130 starts the sub-session. Starting a session may occur with permission of the customer 115, or may be caused to occur without the customer's permission or knowledge that the session has been started. For example, the software on the customer's computer can contact the visualization system 110 to start a visualization session on which the customer's screen will be viewable by the agent 130 without providing notice to the customer 115 that this is occurring and without requiring the customer's consent. Once a customer 115 has started a session, an authenticated agent 130 can join the session. In some embodiments when the agent 130 starts a sub-session, the customer 115 automatically joins the sub-session.

As used herein, the term "start" a session is used to refer to the act of establishing an initial communication channel or communication connection between the mobile device 120 or computer 124 and the visualization system 110, on which information being shown on the device's display will be transmitted on the communication network 105. The term "initiate" a session is used to refer to the act of contacting the visualization system 110 to notify the visualization system 110 that a visualization session should be started.

In some embodiments, the agent 130 may initiate a session by asking the customer 115 to take a particular action in the application. For example, the agent 130 may ask the customer 115 to click a button on the application interface to start a visualization session.

In some embodiments the agent 130 is able to initiate visualization sessions, the customer 115 can initiate visualization sessions, and third-party systems such as the application system 150 can initiate visualization sessions. Once the act of initiating a visualization session has occurred, the visualization system 110 will contact the customer 115 to request the customer 115 to start the session. Often, the customer 115 is provided with an opportunity at this stage to accept or decline to start a visualization session. In other instances, the visualization software at the client starts a visualization session without providing notice to the customer 115 or an opportunity for the customer 115 to decline participation in the visualization session.

In some embodiments, once a visualization session has been started, only an authenticated authorized agent 130 can join the visualization session. By restricting who is able to join a session, specifically by only allowing authenticated agents 130 to join visualization sessions that they have been authorized to join, it is possible to provide a relatively high level of security on the visualization sessions. Specifically, since agents 130 must be authenticated by authentication system 160 to join the visualization session, anyone else that attempts to join the visualization session will need to circumvent authentication system 160 to obtain access to the session.

Security on sub-sessions takes advantage of the initial visualization session to exchange messages to connect the sub-session. So implicitly, only an existing endpoint has the ability to initiate or join a sub-session. When an unauthenticated customer 115 starts a sub-session, the session ID (group, passcode, disambiguate ID) and guest ID may be used to verify that a customer 115 that is currently participating in the session is requesting the addition of the sub-session. When the authenticated agent 130 starts a sub-session, the same authentication process used by the agent 130 to join the session may be used to verify that the agent 130 has permission to add a sub-session to the visualization session. In some embodiments, sub-sessions can only be either started or joined by authenticated participants.

Figure 7:
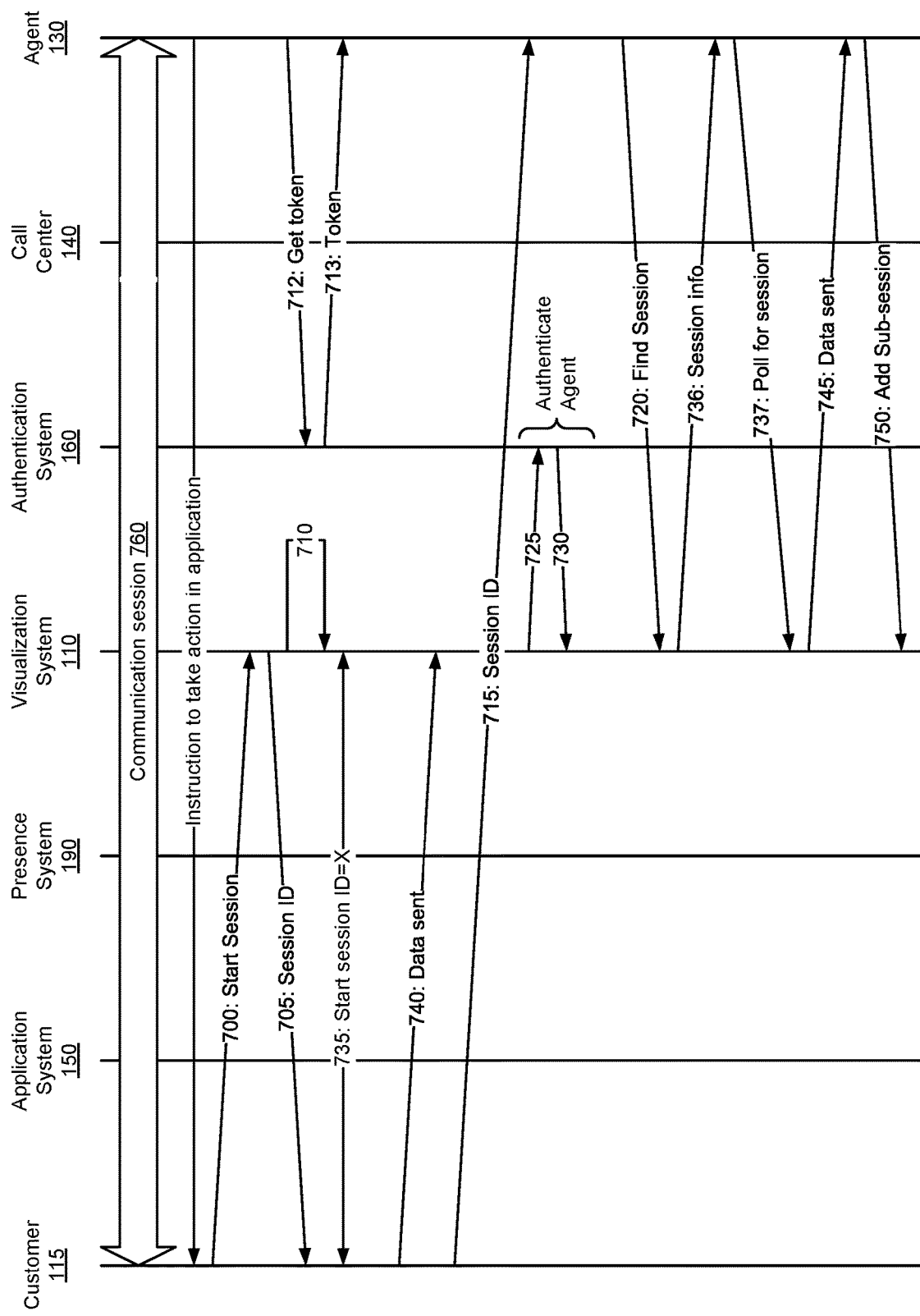
FIG. 7 is a swim lane diagram showing an example exchange of information between components of a system providing visual engagement using automatically dynamically selected visualization mediums according to some embodiments.
Figure 8:
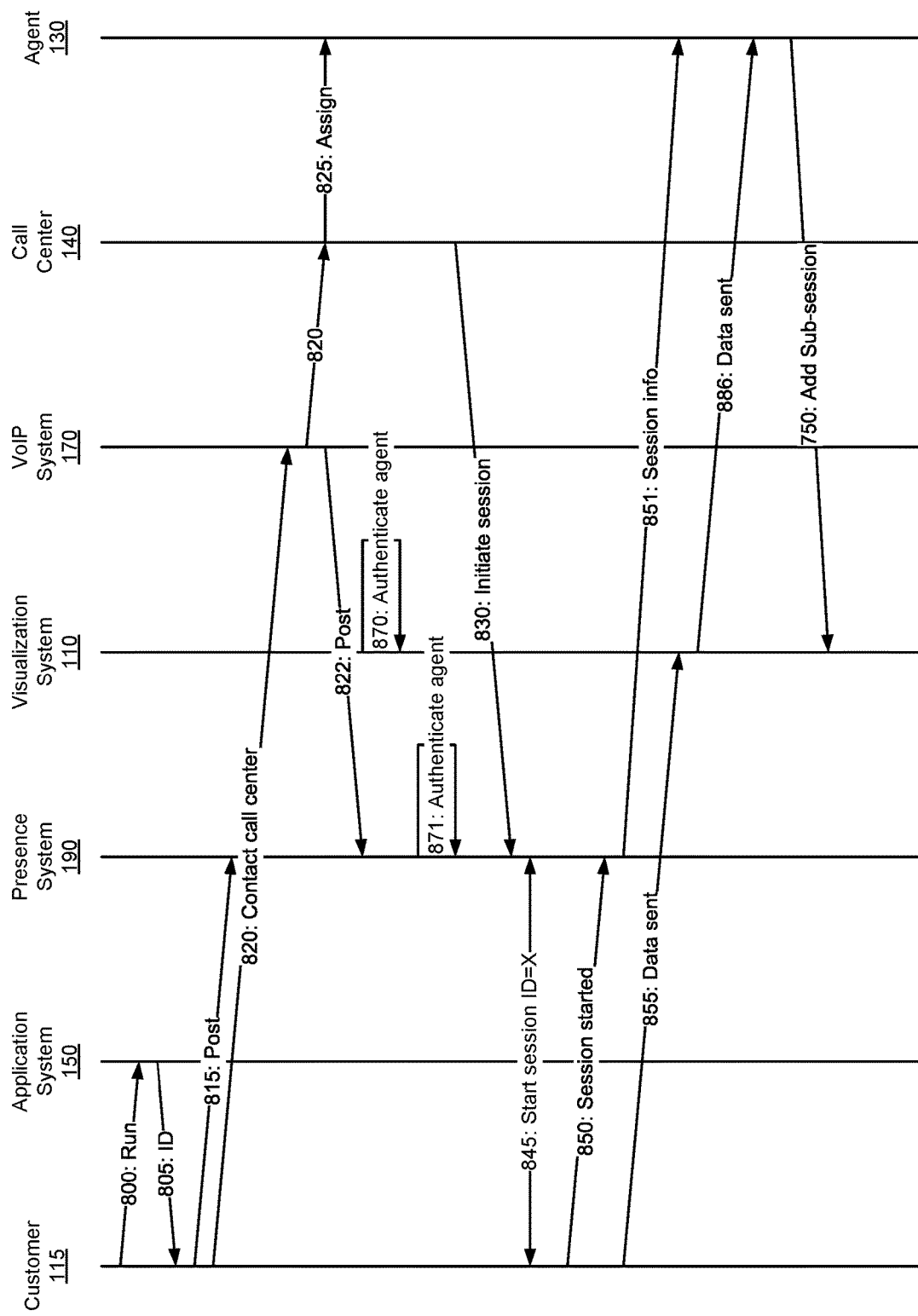
FIG. 8 is a swim lane diagram showing another example exchange of information between components of a system providing visual engagement using automatically dynamically selected visualization mediums according to some embodiments.

FIGS. 7 and 8 are swim lane diagrams showing several example connection scenarios. Other connection scenarios may likewise exist or be developed over time.

FIG. 7 is a swim lane diagram showing an example exchange of information between components of a system providing visual engagement using automatically dynamically selected visualization mediums according to some embodiments. In FIG. 7, the left-hand lane entitled "Customer 115" refers to the mobile device 120 or computer 124 under the control of the customer 115. In FIG. 7, customer 115 is "anonymous" to the visualization service 110, because customer 115 does not need to be identified to the visualization system 110 before requesting that the visualization system 110 start a visualization session. Whenever the visualization system 110 receives a request from a customer 115, the visualization system 110 will start a visualization session. Thus, in FIG. 7 the customer 115 is not required to be a subscriber of the visualization system 110 to obtain visualization services from the visualization system 110.

There are many connection scenarios that may take place, and FIG. 7 shows one such scenario. As shown in FIG. 7, in one typical scenario a customer 115 contacts a call center 140 to obtain help from an agent 130 at the call center 140. This initial contact between the customer 115 and the call center 140 is illustrated in FIG. 7 as arrow 760. The initial contact to the call center 140 may take place using VoIP client 208, telephone 180, or in numerous other ways. For example, as noted above, in some embodiments the customer 115 may click on a "call me" button in the application interface. The communication channel 760, in this instance, may be established when the agent 130 calls the customer 115.

While the agent 130 is providing help to the customer 115, the agent 130 may instruct the customer 115 to take a particular action on the application user interface, such as by clicking a button on the application or touching an icon on a touch-screen. When the user takes this action, a dialog may be provided to the customer 115 to allow the customer 115 to approve that a visualization session should be started. If the customer 115 grants permission, the software at the customer 115 starts a session by contacting the visualization system 110 (arrow 700). As described in greater detail herein, the visualization system 110 does not need to know the identity of the customer 115 when it receives instructions to start a session (arrow 700). Hence, a connection scenario such as the scenario described in connection with FIG. 7 will be referred to herein as an "anonymous session", because at this point the customer 115 need not be previously known to the visualization system 110.

There are other scenarios where the customer 115 and agent 130 are not previously interacting on connection 760. In these situations, if the customer 115 discerns from the application interface that it is possible to contact the call center 140 by taking a particular action on the application user interface, such as by clicking a button on the application or touching an icon on a touch-screen, when the customer 115 does this the software at customer 115 will contact the call center 140 to establish connection 760. Contacting the call center 140 may take place using VoIP client 208. In some embodiments the software at customer 115 will also automatically start a visualization session by sending message (arrow 700) and in other embodiments the software will simply start a VoIP call with the call center 140, and a visualization session may then be added as discussed herein.

FIG. 7 thus shows an example set of messages that may be used to implement an anonymous visualization session. The process shown in FIG. 7 may be used to establish a VoIP session alone (where the visualization system 110 is integrated with the VoIP system 170), or a telephone call or VoIP call plus a visualization session implemented using video, screen share, co-browse, or any combination of visualization technologies.

As shown in FIG. 7, at arrow 700 the customer 115 sends a message to visualization system 110 to start a visualization session. In some embodiments this message includes information identifying the customer 115 and information identifying the type of client being used by the customer 115 or other information that enables the visualization system 110 to determine the type(s) of visualization technology that will be needed to implement the visualization session.

At arrow 705, the visualization system 110 responds to the customer 115 by providing customer 115 with a session identifier (ID), which in some implementations is made visible to the customer 115. The visualization system 110 also provides the customer 115, in arrow 705, with information, such as one or more IP address(es) of the session server(s) at the visualization system 110 that will handle the visualization session for the customer 115.

The session ID uniquely identifies the visualization session from all other current visualization sessions within a group of visualization sessions. The session ID is not part of the security model of the visualization session. Security is enforced by requiring all other session participants 130, 132, to have authenticated with authentication system 160 before joining a visualization session. Thus, the session ID has no relation to securing access to the visualization session. While it might be possible to implement security by using a very long identification number, e.g. 128+ bits, doing so would be too long for the customer 115 to read or the agent 130 to type. Thus, using short session ID numbers and having the agent 130 authenticate is both very secure and easy to use.

At arrow 710, in response to the request from customer 115 (arrow 700), the visualization system 110 provisions resources for the visualization session at servers associated with the visualization system 110. Multiple types of visualization resources may be provisioned to be implemented on the visualization session, including one or more screen share servers, one or more co-browse servers, and one or more video servers, depending on the type(s) of visualization technology to be used to implement the visualization session.

At arrow 735 the customer 115 and assigned session server at the visualization system 110 engage in a bidirectional exchange of messages (handshake) to start the visualization session associated with the session ID. The session server handles the actual transmission of data on the visualization session. By having the customer 115 start a session early in the process, visualization data can be pre-positioned on the visualization system 110 to be made immediately available to the agent 130 once the agent 130 joins the visualization session.

The customer 115 starts the visualization session and begins to send visualization data (arrow 740) to the visualization server(s) specified by the visualization system 110. The data sent by the customer 115 will be identified with the session ID provided by the visualization system 110 in arrow 705. It should be noted that the exchange of signaling between the customer 115 and visualization system 110 is asynchronous to the exchange of signaling between the agent 130 and the visualization system 110. Thus, messaging between the customer 115 and visualization system 110 can take place independently of messaging between the agent 130 and the visualization system 110, and may take place before, during, or after the messaging between the agent 130 and visualization system 110. However, since in some embodiments the agent 130 can only join a visualization session after it has been started by the customer 115, if the agent 130 messaging completes before the customer 115 has started the visualization session, the agent 130 will periodically poll (arrow 737) for existence of the session and, once the session has started, will join the session.

At arrow 715 the customer 115 communicates the session ID to the agent 130 (e.g. by reciting it over the phone or by chat to agent 130). Using a short session ID number simply to identify the session, instead of needing a lengthy session ID to ensure security on the session, enables the customer 115 to read a short ID code and the agent 130 enter a short ID code, which is both very secure and easy to use. When the agent 130 elects to join the visualization session, the agent 130 will use the session ID to identify the customer's specific visualization session to the visualization system 110. However, as noted above, simply having the session ID is not sufficient, by itself, to join a session. Thus, simple possession of the session ID does not allow other people connected to communication network 105 to join the visualization session. Rather, a separate authentication process (arrows 712 and 713) is required to enable the agent 130 to join any visualization session, and in particular the visualization session having the session ID provided by the customer 115. Hence, because the session ID is not being used for security purposes but is only being used to disambiguate the visualization session associated with the customer 115 from other on-going visualization sessions for agents 130 who work for application system 150, the session ID may be quite short. For example, if the visualization system 110 handles at most 999 concurrent visualization sessions for a given call center 140, the session ID may be a three-digit numeric code.

Arrow 715 may be implemented in multiple ways. Where the customer 115 is talking to the agent 130, the customer 115 may tell the agent 130 the session ID verbally. Where the customer 115 is communicating with the agent 130 by text-based communication system, the customer 115 may enter the session ID into the chat stream. Where the application running at the customer 115 sent message 700 to start the session, the application running at the customer 115 may electronically transmit the session ID to the call center 140 or to agent 130.

At arrow 720 the agent 130 sends a request to the visualization system 110 to find the visualization session. In connection with this, the message (arrow 720) passed to the visualization session includes the session ID provided by the customer 115 in arrow 715. The find session message provided by the agent 130 (arrow 720) in some embodiments includes the agent's identifying information and authentication token. Additional information about authentication tokens is provided below.

When the visualization system 110 receives the find session message 720, the visualization system 110 performs an authentication process to determine if the agent 130 is authenticated, e.g. who the agent 130 claims to be, and if the agent 130 is authorized to join the session, e.g. even if the agent 130 is who the agent 130 claims to be, does the agent 130 have permission to perform the requested action.

In some embodiments, once the agent 130 has been authenticated, the visualization system 110 transmits message 736 to the agent 130 specifying the IP address of the session server hosting the visualization session with the customer 115, and a token that allows the agent 130 to connect to that server.

If the visualization session has previously started when the agent 130 sends find session message 720, the customer 115 has been previously sending data needed to render the customer's current view to the visualization system 110, and the agent 130 will be directed to the server(s) at the visualization system 110 to be used to implement the visualization session. If the visualization session has not previously started when the agent attempts to find the session at arrow 720, the agent 130 will periodically poll for the visualization session (arrow 737) and once the visualization session has started the visualization system 110 will begin forwarding data on the session to the agent 130 (arrow 745). Thus, the moment agent 130 discovers the session is running, visualization system 110 can send this (pre-positioned) data to the agent 130 (arrow 745), quickly rendering the customer's most recent view.

Although only one agent 130 has been shown in FIG. 7 as participating in the visualization session, if a second agent 130 or a supervisor 132 would like to join the session from the outset or at a later point in time, the second agent 130 or supervisor 132 need only perform the authentication process (arrows 720, 725 and 730) and then can join the session (arrow 737) to begin receiving visualization information on the visualization session.

Notably, in this process, the agent 130 does not specify to the visualization system 110 what type of visualization technology should be used to implement the visualization session. At the point that the agent 130 joins the visualization session, the agent 130 may not know what type of client the customer 115 is using to run the application or whether the customer 115 is using a mobile device 120 or computer 124. Rather, the agent 130 simply has a single button to click to join the visualization session and the visualization system 110 sorts out the details such as whether the visualization session will be implemented using screen share technology, co-browse technology, or both.

In some embodiments, messages shown in FIG. 7 that are transmitted by the agent 130 are automatically transmitted by an object in the agent CRM when the agent 130 takes the call from the customer 115. In this manner, the CRM automatically establishes the visualization session and can display a thumbnail view of the visualization session for the agent 130 in the agent's CRM user interface. If the agent 130 clicks on the thumbnail view of the visualization session or hovers over the thumbnail view of the visualization session, an expanded view of the visualization session is provided to the agent 130. In other embodiments the visualization session may be a full-sized view, may be displayed in a separate tab in the CRM, or otherwise may be made available to the agent 130.

In some embodiments, signaling between the customer 115 and visualization system 110 (arrows 700, 705, 735, 740) occurs without the customer's knowledge. For example, application 122, 126 may handle the signaling between the customer 115 and visualization system 110 when the customer 115 contacts the call center 140 115 (arrow 715). Thus, when the agent 130 takes the call, the visualization session already exists and the agent 130 can be automatically joined to the visualization session so that the agent 130 is able to see the customer's application directly upon taking the call with the customer 115. As noted above, in some embodiments the visualization session is initially shown as a thumbnail view to the agent so that the agent sees a live thumbnail view of the application 122, 126 in use by customer 115. In some embodiments, the thumbnail view has sensitive information blurred or replaced with gibberish text (ipsum lorem) which provides at least some privacy to the customer 115 until the customer has started talking with the agent 130. In some embodiments, the existence of the previously undisclosed visualization session may be made apparent to the customer 115 when the agent 130 begins to guide the customer 115 by scrolling, pointing, highlighting, directing the customer's browser to a new web page, or takes other action on the customer's application.

In some embodiments, agent 130 is not a live person (at least initially) but instead is an intelligent natural language virtual assistant that uses natural language recognition software to understand input from customer 115 when the customer 115 calls the call center 140. Based on the context, the intelligent natural language virtual assistant dynamically adjusts its responses to the customer 115 to provide automated assistance to the customer 115. Natural language recognition software may include speech recognition software designed to recognize content from auditory input from customer 115 as well as text recognition software designed to recognize content from text-based communications with the customer 115.

In some embodiments, the call center 140 uses machine learning to continuously improve the ability of the intelligent natural language virtual assistants to provide automated assistance to customers 115. Machine learning requires collection of extensive amounts of data, which is used to train the machine learning algorithms to understand the context of a user's input and accurately determine an appropriate output response. In some embodiments, visualization session information is provided to the machine learning algorithm and used as an input into the machine learning algorithm to enable visual context to be used in training the intelligent natural language virtual assistants. Use of visualization session information data in the training process likewise allows current customer 115 visualization session information to be used by the intelligent natural language virtual assistant to ascertain the context of a present customer 115 and discern an appropriate output response for the current customer 115.

In some embodiments, visualization system 110 can provide machine learning algorithm the browsing activity of any or all customers 115 interacting with a website 150. Generally, one of a machine learning algorithm's toughest challenges is getting enough data to learn what's happening. However, currently the manner in which users interact with a website is not known to the webserver 150, because modern websites use JavaScript to locally modify what the customer 115 sees. Thus, the webserver 150 cannot provide full information to a machine learning algorithm about how customers 115 are accessing a website because the webserver itself does not have access to this information. In some embodiments, however, the visualization system 110 does have full access to what customers 115 are seeing and, accordingly, can provide full visual information to the machine learning algorithm. For example, in some embodiments the co-browsing system 114 receives DOM updates from each of the website visitors on visualization sessions and provides that information to the machine learning algorithm. This enables the machine learning algorithm to know exactly what the customers 115 are seeing as they interact with the website. Using this data, alone or in combination with when/where on the website customers 115 tend to call for help, the machine learning algorithm can learn where users get stuck and what remedy is required to fix the issue.

As shown in FIG. 7, there are instances where the agent 130 would like to show video back to the customer 115 on the visualization session or where the agent 130 would like to also receive video information from the customer 115. In some embodiments, the agent 130 sends a message (arrow 750) to the visualization system 110 requesting the addition of a sub-session to the visualization session. In some embodiments, a sub-session is a separate visualization session created by the visualization system 110 on which separate visualization data is transmitted between the participants. The term "sub-session" is used herein to refer to a separate visualization session that takes advantage of the initial visualization session as a communication path to channel signaling needed to establish the second visualization session. Because the same signaling process discussed above in connection with signaling the main visualization session is also used to establish the sub-session, details of sub-session signaling are not shown in FIG. 7.

The sub-session request (arrow 750) may request the creation of a visualization session on which the agent 130 will show video to the customer 115 or may request creation of a visualization session on which the customer 115 will show video back to the agent 130. Other types of sub-sessions may likewise be created.

Use of a video visualization sub-session may be useful in numerous contexts. For example, the call center 140 may want to provide the customer 115 with a live webcam view of the agent 130 so that the customer 115 can see who is helping them at the call center 140. One benefit of this is that, where the customer 115 sees the live agent 130, the customer 115 is less likely to behave disrespectfully. It also can provide the agent 130 with an incentive to be more attentive since the agent 130 knows that the customer 115 can see her or him. Thus, a web cam at the agent 130 may capture a live view of the agent 130 and stream the live view of the agent 130 on the video visualization sub-session to the customer 115. Likewise, the agent 130 may have agent selected video, such as multiple previously prepared short video clips that succinctly explain how to use particular features of the application. For example, where the application is financial services software, the agent 130 may have a selection of short video clips describing particular investments or other aspects of the investment process that the agent 130 can play for the customer 115. The agent 130 may also use a sub-session to show screen capture information to the customer 115. For example, an agent 130 may use screen capture software to capture information shown on the agent's screen or information shown on an attached device to the customer 115 on a screen share sub-session.

Video visualization sub-sessions on which the customer 115 shows video or pictures back to the agent 130 can likewise be useful in numerous contexts. For example, if the customer 115 is contacting an automobile insurance call center 140, the agent 130 may want to activate a prompt to invite the customer 115 to activate the camera 216 of the mobile device 120 to receive a picture of the automobile or to receive a video of the automobile damage to better validate the reported damage actually occurred. As another example, if a field service technician 115 calls into the home office call center 140 because they are experiencing difficulty with repairing some industrial machinery, the agent 130 or technical support person at the call center 140 may want to activate a prompt to instruct the field service technician to activate the camera 216 of the mobile device 120 to be able to see what type of modem the customer 115 is using and see what lights are blinking on the modem to help diagnose the network connectivity issue. As yet another example, a machine repairperson (customer) working on a highly technical piece of industrial equipment may need guidance or want to consult with another skilled remotely located technician (agent) or may need to show that a particular ordered repair has been completed. Multiple uses for video visualization sub-sessions thus may be contemplated.

Although an example was provided in which a video visualization sub-session was added to an existing visualization session, other types of visualization sub-sessions may be added in the same manner. For example, if the visualization session is currently being implemented as a co-browse session on which the agent 130 is viewing the customer's 115 browser 210, the visualization session may be escalated to also include a screen-share session to allow the agent 130 to view the customer's 115 entire desktop or a selection of white-listed applications on the customer's mobile device 120 or computer 124. Other types of escalation scenarios may likewise be implemented by adding various types of sub-sessions to existing visualization sessions. Thus, sub-sessions are not restricted to the transmission of video from the agent 130 to the customer 115, but may also include transmission of video from the customer 115 to the agent 130. Where a supervisor is participating in the visualization session, in some embodiments the supervisor may likewise launch sub-sessions on which various types of visual media may be viewed by the customer 115 and/or agent 130.

FIG. 8 is a swim lane diagram showing another example exchange of information between components of a system providing visual engagement using automatically dynamically selected visualization mediums according to some embodiments. The swim lines of FIG. 8 are similar to the swim lanes of FIG. 7, except that FIG. 8 shows VoIP system 170 instead of authentication system 160. Interaction with the authentication system 160 in FIG. 8 is the same as described above in connection with FIG. 7.

In FIG. 8, instead of having the agent 130 instruct the customer 115 to start a visualization session, the customer 115 automatically starts a visualization session when contacting the call center 140. To prevent the customer 115 from needing to learn the session ID and communicating the session ID to the agent 130, in FIG. 8, the application system 150, presence system 190, visualization system 110, and call center 140, each has contact with the customer 115 and the presence system 190 uses whatever information it is able to obtain from the various sources to match the visualization session started by the customer 115 with contact information associated with the customer 115 at the call center 140.

In some embodiments, the application running on the customer device or the presence application 206 on the customer device connects to application system 150 (arrow 800) and application system provides the customer with an customer ID (arrow 805). The customer then posts the customer ID to the presence system 190 (arrow 815). As noted above, different customers 115 are all using the same application, but are running different types of application clients (hybrid app, native app, web app, etc.). The same agent 130 is tasked with providing customer support for the customers 115 and does not know, before taking a customer support call, the type of application in use by the customer 115.

In some embodiments, applications 122, 126 provide information such as the customer ID from arrow 805 to the presence system 190 (arrow 815) in connection with execution of the application which includes information about the type of client in use by the customer 115. The presence information may be provided automatically when the application is initiated, periodically as the application is used, or upon initiation of contact between a customer 115 and a call center 140. In some embodiments, if a user selects a help button displayed by the application, selection of the help button posts presence information to a presence system 190. Optionally, selecting the help button also initiates a voice call, e.g. using VoIP client 208. Where the VoIP client 208 is assigned a specific number or number plus extension by the VoIP system 170, the assigned number or number plus extension can also serve as another unique identifier of customer 115. In some embodiments, selecting a help button to initiate contact with the call center 140 causes the user to be prompted to input the telephone number of their smartphone. This information is thus directly accessible to the application and hence to the presence client, to enable the presence system 190 to know the telephone number associated with the end device.

When a call arrives at the call center 140, a routing module routes the call to an available agent 130. In some embodiments, the call center 140 polls the presence system 190 for information about the customer 115 for use in routing the call. In some embodiments the call center 140 provides the information about the customer 115 to the visualization system 110 to enable the visualization system 110 to determine whether a visualization session has been established with the customer 115. Information received from the presence system 190, in some embodiments, is used by the routing system of the call center 140 130 to route the call to the best agent 130 to assist the customer 115 and is used by the CRM at the agent 130 to pop the CRM record for the customer 115. Where a visualization session already exists, the visualization session can likewise be immediately presented to the agent 130 so that the agent 130 can see what the customer 115 is doing while talking to the customer 115 on the call, with or without the customer's knowledge.

Within the call center 140, the call may be routed using a normal call routing system because the calls from customers 115 are normal audio calls that can be handled in the same way as any other audio calls received by the call center 140. In some embodiments, in connection with routing the call, information from the VoIP call is used to extract a customer record from the CRM system 145 for presentation to the agent 130 when the agent 130 accepts the call. Existing Computer Telephony Integration (CTI) systems may be used to pull customer records from the CRM system in a known manner. When agent 130 accepts the call, the CRM record for the user will be displayed in the agent's CRM client.

When the agent 130 takes the call, the agent 130 may interact via the CRM client to instruct the CRM application to instruct the presence system 190 to initiate a visualization session with the customer 115 associated with the telephone call. In some embodiments, the CRM client 145 at the agent 130 has a single visualization session initiation button on the CRM record displayed in the CRM client that the agent 130 uses to request establishment of the visualization session, regardless of the underlying technology that will be used to display the user's view of the application. Although some embodiments will be described in which screen sharing and co-browsing are two example underlying technologies that are used to provide the agent 130 with a view of the user's application, in other embodiments other remote viewing technologies may be incorporated as well or instead of screen sharing and co-browsing, such as one or two-way video between the agent 130 and customer 115. Likewise, a blend of multiple visualization technologies may be used.

The customer 115 may contact the call center 140 directly (e.g. arrow 820 may terminate at call center 140) or the customer contact to the call center 140 may take place via VoIP system 170 as shown in FIG. 8, where arrow 820 extends from customer 115 to VoIP system 170 and then extend from VoIP system 170 to call center 140. Where the customer 115 contacts the call center 140 using a telephone 180, the call center 140 has the telephone number that was used to place the call and the CRM can use the telephone number as a part of the identifying information of the customer 115. Where the customer 115 contacts the call center 140 via the VoIP system, the VoIP system will provide the call center 140 with information about the customer 115. In some embodiments, the VoIP system also posts information about the customer 115 and assigned telephone number or telephone number extension to the presence system 190 (arrow 822). For example, customer information known to customer 115 or application 150 can be passed to VoIP system 170 to associate the dynamically assigned VoIP phone number/extension with customer 115. Often, a call center 140 will have a script that is used to prompt the customer 115 to input identifying information, such to request that the customer 115 speak or enter their account ID, say their name, etc. when the customer 115 first contacts the call center 140. Thus, the call center 140 may obtain information about the customer 115 directly from the customer 115.

Since contact between the customer 115 and the call center 140 is implemented using a normal telephone call, the telephone call is able to be routed through the call center 140 using the call center 140's standard routing techniques, without requiring special infrastructure in the call center 140 to support some other media type such as WebRTC.

In arrow 825 the call center 140 assigns the call to an agent 130 or the agent 130 picks up the call from a queue of calls at the call center 140. When the agent 130 takes the call, the agent's CRM pops an object that contains information about the customer 115. In some embodiments, the CRM object transmits a command to presence system (arrow 830) to initiate a visualization session when the agent 130 clicks on a join button within the CRM object or optionally the CRM object may transmit the command (arrow 830) to initiate a visualization session automatically when the agent 130 takes the call.

In some embodiments, when the call center 140 assigns agent 130 to a call, agent 130 opens a CRM object which includes information that identifies customer 115. A resource on the same CRM object, by virtue of the agent 130 having logged into the CRM system 145, hence into visualization system 110 (arrow 870: authenticate agent), has privilege to query presence system 190 to see if customer 115 is known to be online (i.e. using application 150). If so, then the presence system 190 sends a command to the customer application 122 or 126 to start a visualization session with a specific session ID. In some embodiments the agent must also be authenticated to the presence system 190 (arrow 871). In some embodiments, the session ID is generated by the presence system 190 as a unique identifier for the customer, or from a field in the case/contact/etc. object of the agent's CRM system, which may contain the customer's unique identifier.

When the visualization session is started, the customer 115 posts a confirmation message (arrow 850) to the presence system. The presence system 190 provides session information to the agent 130 (arrow 851) to enable the agent to connect to the visualization session. Data is then sent on the visualization session from the customer 115 to the visualization system 110 (arrow 855) and from the visualization system 170 to the agent 130 (arrow 856). Optionally, at this point, the customer 115 does not know that the visualization session has started. Later, if agent 130 chooses to interact with the application running on customer 115, the customer 115 may discern that the agent is able to see the application.

In some embodiments, the initiate session message (arrow 830) includes the information that the call center 140 has extracted from the customer 115 or other information that the call center 140 has about the customer 115 in the CRM system. For example, where the customer contact (arrow 820) is a VoIP call, the initiate session message may include the telephone number or extension dynamically assigned to the VoIP call. Where the customer contact (arrow 820) is a call from a telephone 180, the initiate session message may include the telephone number of the telephone 180 used to place the call. Where the call arrives at the call center 140 from the VoIP system 170, the telephone number assigned to the customer 115 by the VoIP system 170 may be included in the initiate session message 830. Where the call center 140 has collected information from the customer 115, that information may also be included in the initiate session message 830.

When the presence system 190 receives the initiate session message (arrow 830), the presence system 190 extracts any included customer identifying information from the initiate session message and uses the customer identifying information to look for any known customers 115 matching that customer identifying information. For example, as noted above, in some embodiments the application 122, 126 posts information about the customer 115 to the presence system 190. Accordingly, in some embodiments the presence system 190 can match the customer identifying information to information provided by the application to identify which customer 115 should be instructed to start a visualization session and to determine the type of visualization technology to be used to implement the visualization session. In other embodiments, for example where the customer 115 uses VoIP system 170 to initiate contact with the call center 140, the VoIP system 170 may dynamically assign a telephone number or extension for use in connection with the call to the call center 140 and may provide the assigned VoIP telephone number to the visualization system 110.

In some embodiments, the presence system 190 is implemented as described in greater detail in U.S. patent application Ser. No. 15/270,258, entitled Presence Enhanced Co-Browsing Customer Support, filed Sep. 20, 2016, the content of which is hereby incorporated herein by reference.

If the presence system 190 returns a negative result, the agent 130 can prompt the customer 115 to proceed with the process described above in connection with FIG. 7 to establish a visualization session.

At arrow 845, the presence system 190 transmits an instruction to the customer 115 to start a visualization session. In some embodiments the instruction includes a visualization session ID that uniquely identifies the session at the visualization system 110 and information about the server(s) that have been assigned to host the session at the visualization system 110. The visualization session ID needs only to be of sufficient size to disambiguate the session at the visualization system 110 and is not used for security. Thus, for example, where the visualization system 110 is handling on the order of 500 sessions for a particular group of agents 130 or for a particular call center 140, a 3-digit number is sufficient as a session ID to allow the visualization system 110 to discern the visualization session from this particular customer 115 from all other visualization sessions in use by other customers 115 for the group of agents 130 or call center 140. The visualization system 110, in some embodiments, may handle multiple groups of agents 130 for a given call center 140 and likewise may provide visualization services for multiple call center 140s. In some embodiments, where agents 130 are logically grouped at the visualization system 110, the session ID only needs to be globally unique within the logical group.

In some embodiments, when the customer 115 receives the instruction to start a visualization session, the customer 115 will receive a prompt asking the customer 115 to consent to starting the visualization session. For example, a dialog may pop and include an option to allow the customer 115 to either accept starting of a visualization session or decline to start the visualization session. Where the customer 115 declines the visualization session the process ends and, optionally, the call center 140 or agent 130 may be notified that a visualization session is not available with the customer 115 because the customer 115 has declined to participate on the visualization session. Where the customer 115 accepts the invitation to participate in the visualization session, and the customer 115 clicks on the accept button, in some embodiments the session starts and the customer 115 begins transmitting data (arrow 855) to the visualization system 110. In some embodiments the customer 115 is not authenticated to the visualization system 110 before starting a visualization session.

Once the customer 115 has agreed to the visualization session, the agent 130 and/or call center 140 must still join the session. The reason for having the agent 130 join the session is security—by only allowing an authenticated and authorized agent 130 to join the session it is possible to keep the visualization session secure. The visualization system 110 will not allow anyone (other than the customer 115) that is not authenticated to join a customer's visualization session. Thus, a person with access to the communication network 105 cannot join a visualization session without spoofing the authentication system 160 which is significantly more difficult than serially guessing visualization session identification numbers.

Accordingly, at arrow 870 the agent authenticates with the visualization system 110 to obtain permission to join visualization session with the customer 115. Authentication may take place at any point in the process. In connection with this, the message passed from the agent 130 to the visualization system 110 includes the session ID associated with the visualization session, and the agent's identifying information and authentication token. Additional information about authentication tokens is provided below. In some embodiments, the authentication process (arrow 870) includes determining if the agent 130 is authenticated, e.g. who the agent 130 claims to be, and if the agent 130 is authorized to join the session, e.g. even if the agent 130 is who the agent 130 claims to be, does the agent 130 have permission to perform the requested action.

Once the agent 130 has been authenticated, and it is determined that the agent 130 is authorized to join the visualization session, the agent 130 will join the visualization session and start to receive visualization information on the visualization session (arrow 886). Although only a single agent 130 is shown as receiving data via arrow 886, where more than one agent 130 has authenticated to participate in the visualization session with the customer 115, the visualization system 110 will transmit data to each such authenticated agent 130.

At the agent terminal, the agent 130 support client or CRM 145 has a single button that the agent 130 can interact with to cause a view of the customer's application to become available to the agent 130. Instead of having a "join co-browse," "join screen share" or other mode-specific button, the agent 130 simply clicks on a single "join" button without needing to know whether the underlying visualization session will be supported using screen share technology, co-browse technology, view the customer's mobile device's video feed, or use a combination of two or more of these visualization technologies. The visualization system 110 uses the mode information from the presence system 190 or from application system 150 to ascertain the type of visualization session to use, and automatically provides the agent 130 with a visualization session using the correct type of visualization technology based on the mode of the application client in use at the customer 115. Since the visualization session is independent of the audio phone call, the call center 140 does not need to implement special routing to enable the visualization support to be provided by the agent 130. Since the audio phone call may be supported by standard PSTN or Voice over IP (VoIP) routing, it more likely to be successfully completed and more likely to be able to traverse firewalls than web-based peer-to-peer WebRTC calls.

The process described in connection with FIG. 8 is similar to the process described in connection with FIG. 7, in that in both processes the agent 130 does not specify what type of visualization technology should be used to implement the visualization session. Rather, the visualization system 110 receives information about the type of technology to be used to implement the visualization session from the application system 150, the presence system 190, or optionally from the customer 115 directly. Thus, the agent 130 does not need to know how the customer 115 is running the application, but rather simply has the option to join the visualization session with the customer 115 and the visualization system 110 handles all the details associated with determining the type of technology to use to implement the visualization session with the customer 115 and present the visual information to the agent 130. Thus, the agent 130 simply has a single button to click to join the visualization session and the visualization system 110 sorts out the details such as whether the visualization session will be implemented using screen share technology, co-browse technology, video from the customer's camera, or any combination of two or more of these visualization technologies.

In some embodiments, instead of having the agent 130 elect to send initiate session message (arrow 830), the initiate session message (arrow 830) is sent automatically by the CRM object when the agent 130 accepts the call. The CRM being used by the agent 130 knows the identity of the agent 130 that has been assigned to handle the call and hence can transmit a copy of the agent's 130 authentication token to the visualization session when the agent 130 takes the call. Thus, the CRM in some embodiments is able to request that the agent 130 be joined to the visualization session on behalf of the agent 130. Accordingly, the visualization session can be presented to the agent 130 automatically when the agent 130 accepts the call without requiring the agent 130 to take any action on the CRM object. In some embodiments, the visualization session automatically appears in the agent's CRM user interface, for example, as thumbnail view in a region of the agent's CRM user interface, as a tabbed window within the CRM, or as a tab or window separate from the CRM UI. If the agent 130 clicks on the thumbnail view of the visualization or hovers over the thumbnail view the view of the visualization session will be expanded so that the agent 130 is able to see an expanded view of the information being transmitted on the visualization session.

As described in connection with FIG. 7, there are instances where the agent 130 would like to show video back to the customer 115 on the visualization session or where the agent 130 would like to also receive video information from the customer 115. Once the agent 130 and the customer 115 have established the visualization session, one or more sub-sessions may be added to the visualization session as described above in connection with arrow 750. To prevent FIG. 8 from being cluttered, the process of establishing sub-sessions associated with the original visualization session is not shown in FIG. 8.

Similarly, in some embodiments, rather than having the customer 115 start a visualization session using screen-sharing or co-browsing technology, the customer 115 may be instructed to activate a camera (e.g. on their smartphone) and the process shown in FIG. 7 or 8 may be used to show live video from the customer's camera to the agent 130 on a visualization session. This may be useful, for example, to enable a field representative (positioned in FIG. 7 or 8 as customer 115) to provide video to a technical expert (positioned in FIG. 7 or 8 as agent 130), to obtain consultation on a project/repair that the field representative is conducting. Accordingly, many options are possible.

One way for a customer 115 to contact the call center 140 is to establish a telephone call with the call center 140. Where the customer 115 is using a laptop or desktop computer 124 the customer 115 will often have a separate telephone 180 that may be used to contact the call center 140. Optionally, the customer 115 may also have a telephony client on their computer 124 that may be used to contact the call center 140.

Where the customer 115 is using a mobile device 120 such as a smartphone, in some embodiments the visualization software 121 in use at the mobile device 120 includes a VoIP client 208 configured to interact with VoIP system 170 to allow the customer 115 to contact the call center 140. In some embodiments, when the VoIP client 208 is activated, the VoIP client 208 contacts the VoIP system 170 to receive a dynamically assigned telephone number/extension for use during the telephone call with the call center 140. When the call with the call center 140 is over, the dynamically assigned telephone number/extension will be released by the VoIP client 208 and return to a pool of dynamically assignable telephone numbers/extension for reuse by the VoIP system 170. Thus, if the call center 140 can handle at most 1000 concurrent telephone calls, the VoIP system 170 needs to have at most a pool of 1000 dynamically assignable telephone numbers to support mobile customers 115 for the call center 140. Alternatively, the VoIP system may have one number and 1000 dynamically assignable extensions that can be assigned to customers 115 attempting to contact the call center 140.

Figure 9:
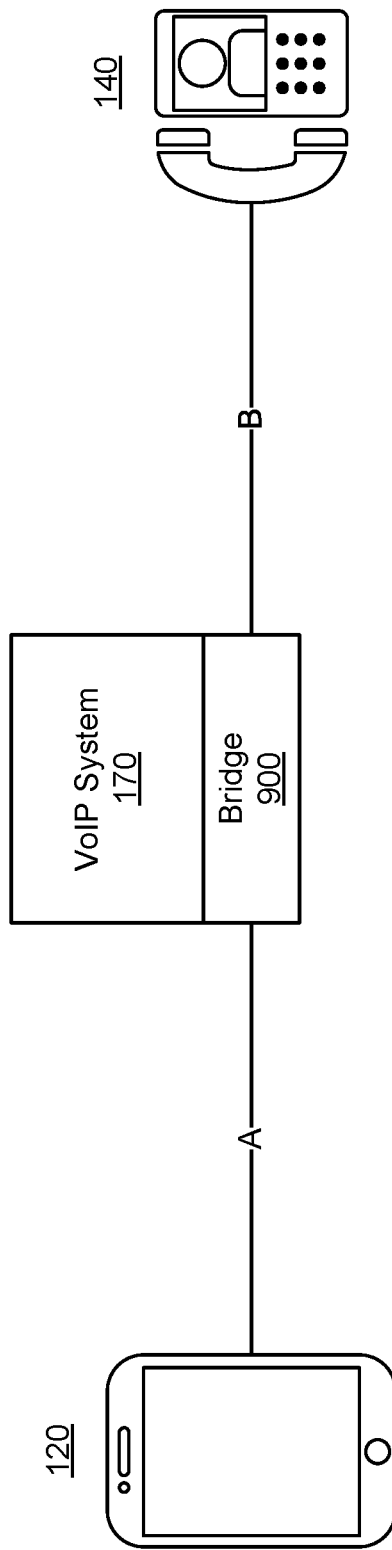
FIG. 9 is a functional block diagram of a telephony system for providing persistent audio connections in a system providing visual engagement using automatically dynamically selected visualization mediums according to some embodiments.

FIG. 9 is a functional block diagram of a telephony system for providing persistent audio connections in a system providing visual engagement using automatically dynamically selected visualization mediums according to some embodiments. As shown in FIG. 9, when the VoIP system 170 dynamically assigns a telephone number/extension to the customer 115 (mobile 120), the VoIP system 170 will also implement the VoIP signaling with the call center 140 to establish the VoIP call between the customer 115 and the call center 140.

In some instances, the mobile device 120 may initially be connected to a WiFi network and in other instances the mobile device 120 may initially be connected to a cellular network. In either instance, if the mobile device 120 performs a handoff to switch the type of wireless connection, there is a possibility that the VoIP call will be dropped. For example, if a customer 115 is initially talking to the call center 140 on a smartphone connected to a local WiFi network, and then leaves the local WiFi area, the customer's smartphone will attempt to hand the call off from the WiFi network to the cellular network. When this occurs for a VoIP call, it is possible that the handoff may not occur correctly, causing the VoIP call to be dropped. Likewise, it is not uncommon for cellular calls or calls on a WiFi network to be dropped. The customer 115, who has been on a telephone call with the call center 140, obviously would like to continue receiving support from the same agent 130. However, normally if a call is dropped, the connection at the call center 140 will be terminated which drastically reduces the likelihood that the customer 115 will be reassigned to the same agent 130. Moreover, in all likelihood the customer 115 may need to wait for a while to be assigned to another agent 130 at the call center 140, particularly where the call center 140 is experiencing a high call volume.

According to some embodiments, the VoIP system 170 establishes a bridge 900 to handle the VoIP call between the customer 115 and the call center 140. As shown in FIG. 9, in some embodiments the bridge 900 has rules designed to increase the persistency of the VoIP call between the customer 115 and the call center 140 to enable reconnection in the event of an unintended call drop. Specifically, in some embodiments the bridge 900 implements a first rule that the bridge 900 will not drop the conference if connection A between the customer 115 and the bridge 900 is dropped. Thus, if the customer 115 attempts to handoff a call from a wireless network to a cellular network, and the VoIP call is dropped, the bridge 900 will maintain the conference with the agent 130. Likewise, if the customer 115 contacts the call center 140 using a cellular phone, and the cellular phone call is dropped, the bridge will maintain the conference with the agent 130. Thus, if the customer 115 attempts to re-establish the call via the VoIP system 170, the VoIP system 170 can simply reconnect the customer 115 to the bridge 900 to enable the customer 115 to continue talking to the same agent 130.

To enable the call to end, in some embodiments the bridge 900 implements a second rule that the bridge 900 will drop the conference if the connection B between the call center 140 and the bridge 900 is dropped. Thus, if the agent 130 hangs up the phone, for example when the agent 130 is done helping the customer 115, the bridge 900 will automatically terminate so that the agent 130 is immediately free to help another customer 115.

In some embodiments the bridge 900 implements a third rule, that the bridge 900 will drop the conference between the customer 115 and the agent 130 if the connection A between the customer 115 and the bridge 900 is not re-established within a particular time period. For example, if connection A between the customer 115 and the bridge 900 is dropped and not re-established within 60 seconds, the bridge 900 will terminate and release the connection B between the agent 130 and the bridge 900. This frees the agent 130 to help another customer 115. Although a 60 second time-period has been used as an example, other time periods such as a 30 or 120 second time period may be used as well depending on the particular implementation. This third rule provides the customer 115 with a brief window of time to call back to the call center 140 and be connected to the same agent at the call center 140.

When a mobile device 120 is being used to run application 122, and the same mobile device 120 is to be used to implement a phone call with the call center 140, interaction between the customer 115 and the mobile device 120 can present unique challenges.

Figure 10:
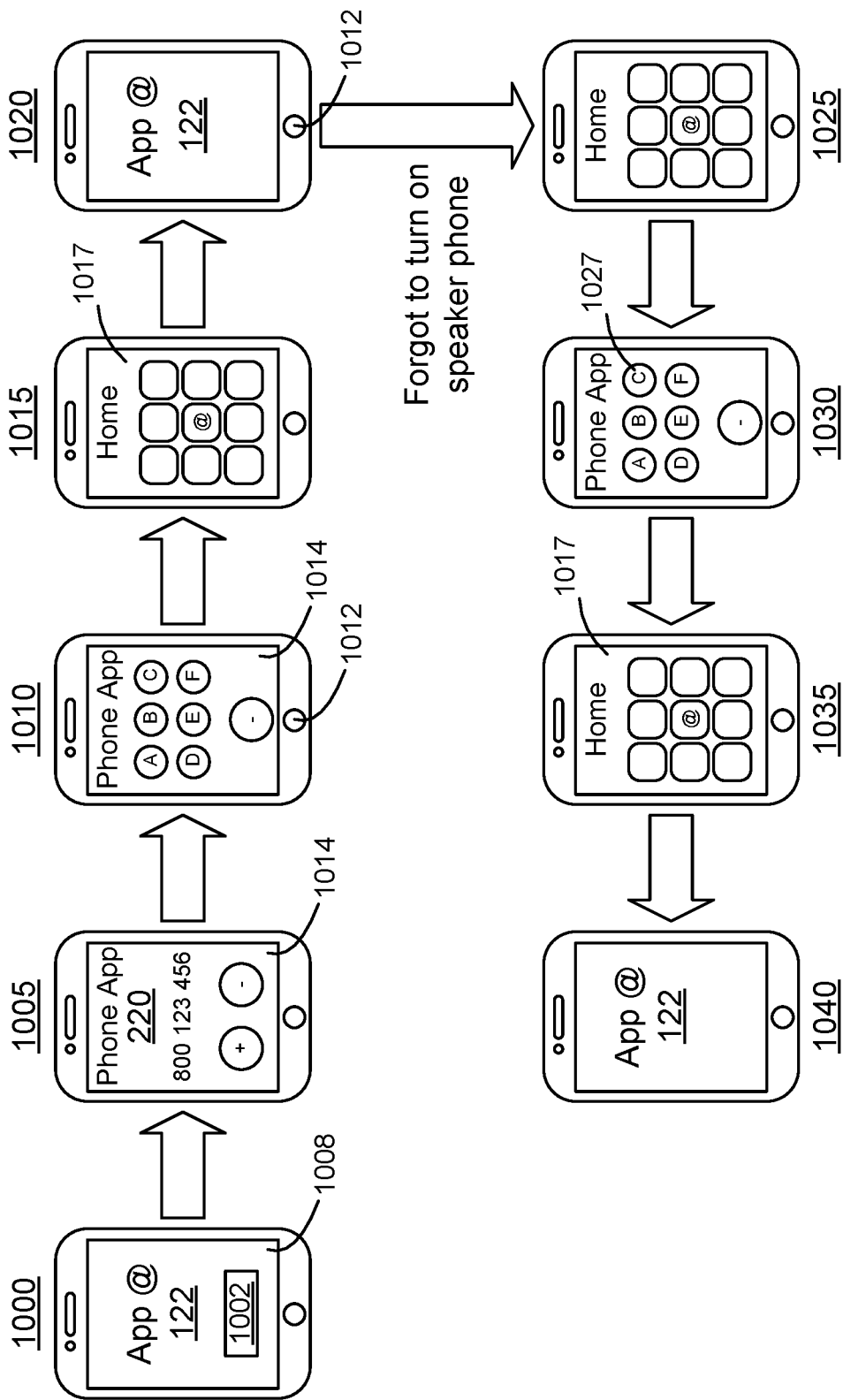
FIG. 10 is a flow diagram of a known process for making a telephone call on a mobile device while working with another application on the mobile device.

FIG. 10 shows an example prior art process of using the same mobile device 120 to run an application 122 and to place a phone call to the call center 140 using the phone's native telephone application 220. The images separated by arrows show the appearance of the screen of the mobile device 120 over time at different stages, as the mobile device 120 is used to interact with both the application 122 and the native telephone application 220.

As shown in FIG. 10, initially (screen shot 1000) the customer 115 has opened application 122 and is interacting with a user interface 1008 of the application 122. If the customer 115 presses a button 1002 in the user interface of application 122 to make a phone call to the call center 140, pressing the phone button 1002 will cause the native telephone application 220 to be launched. When the native telephone application 220 is launched, as shown in screen shot 1005, launching of the native telephone application 220 will cause the user interface 1014 of the native telephone application 220 to be shown instead of the user interface 1008 of application 122.

If the customer 115 presses the connect key (indicated with a + in screen shot 1005) on the user interface 1014 of the native telephone application 220, the native telephone application 220 will complete the telephone call between the mobile device 120 and the call center 140 and the user interface 1014 of the native telephone application 220 will present the customer 115 with a menu of options labeled A-F in screen shot 1010.

At this point, the customer 115 is on a telephone call with the call center 140 and will need to return to the application 122 to continue working in the application 122. Accordingly, in some mobile devices 120 such as the iPhone or iPad, the customer 115 will press home button 1012 to return to a home screen 1017 of the mobile device 120 as shown in screen shot 1015. By pressing the icon labeled with an @ symbol in home screen 1017, the customer 115 will be returned to the application 122 as shown in screen shot 1020.

If the customer 115 forgot to put the phone call on speaker phone, i.e. forgot to press the speaker phone button in the menu of options in screen shot 1010, and the customer 115 does not have a headset to be used to participate in the phone call, the customer 115 will find that they need to hold the phone to their ear to hear the audio of the telephone call. This, obviously, would prevent the customer 115 from seeing the display of the mobile phone 120. Accordingly, as shown in FIG. 10, to correct this, the customer 115 must once again press the home button 1012 as shown in screen shot 1025, select the phone application to cause the user interface of the native telephone application 220 to appear as shown in screen shot 1030, and select the speaker phone button 1027. The customer 115 will then need to once again hit the home button 1012 to return to the home screen 1017 as shown in screen shot 1035, and then select the @ icon to return to the application user interface 1008 as shown in screen shot 1040.

Figure 11:
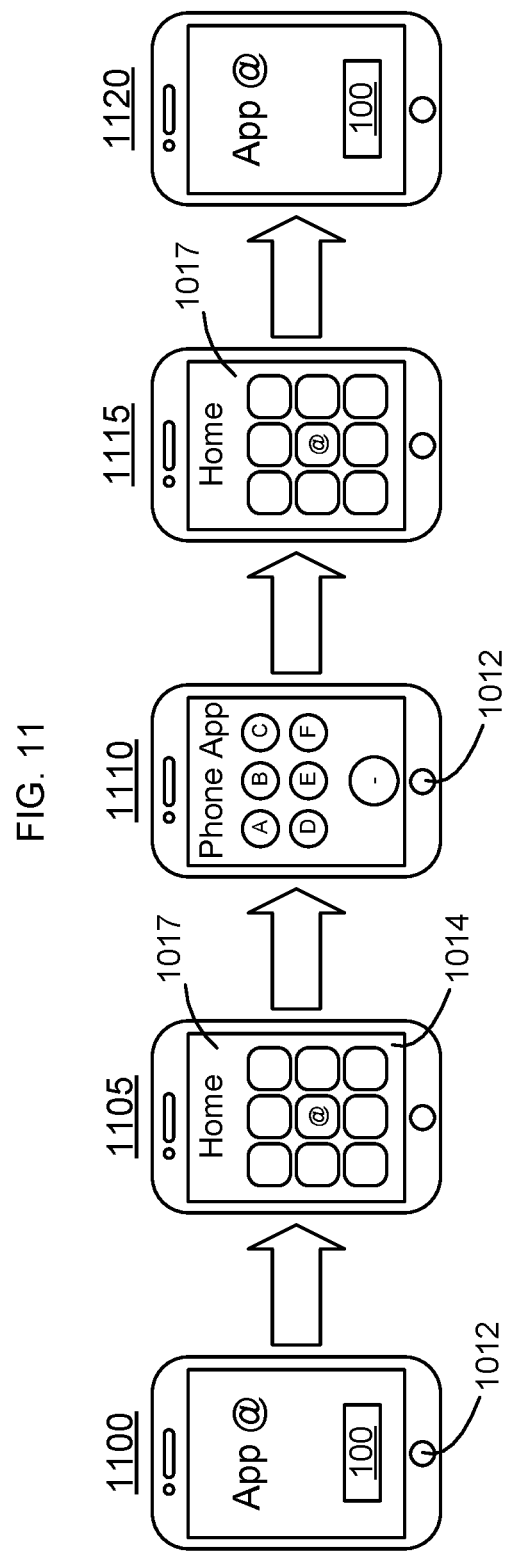
FIG. 11 is a flow diagram of a known process for ending a telephone call on a mobile device while working with another application on the mobile device.

FIG. 11 shows a similar process that the customer 115 would need to perform to end a telephone call while viewing the application 122 user interface (screen shot 1100). As shown in FIG. 11, assuming the customer 115 is on a phone call and would like to end the phone call, if the agent 130 does not disconnect the phone call the customer 115 will need to press the home button to arrive at home screen 1017 (screen shot 1105). When the customer 115 selects the phone application icon, the user interface 1014 of the native telephone application 220 will appear as shown in screen shot 1110. If the customer 115 hits the end button (the round icon with the – sign), the phone call will end. To exit the native telephone application 220 the customer 115 will once again press the home button 1012 to return to the home screen 1017 as shown in screen shot 1115. If the customer 115 selects the application icon, labeled with an @ sign in screen shot 1115, the mobile device 120 will display the user interface 1008 of the application 122, as shown in screen shot 1120.

FIG. 12 is a flow diagram of a process for making a telephone call on a mobile device 120 while working with another application 122 on the mobile device 120 according to some embodiments. As shown in FIG. 12, initially (screen shot 1200) the customer 115 has opened application 122 and is interacting with the user interface 1208. If the customer 115 selects a control object 1202 in the user interface of application 122 to make a phone call to the call center 140, selecting the control object 1202 causes VoIP client 208 to contact VoIP system 170 without affecting the customer's view of the application interface 1208. In some embodiments, selecting control object 1202 also causes initiation of a visualization session via visualization system 110. Depending on the implementation, selecting the control object 1202 starts only a VoIP call or a VoIP call plus a visualization session including co-browse technology, screen sharing technology, live video from the agent 130 to the customer 115, live video from the customer 115 to the agent 130, or a combination of multiple types of visualization technologies.

When the VoIP system 170 has completed call signaling, in connection with signaling the VoIP call, or when an agent 130 becomes available to take the call, the VoIP client 208 will present the customer 115 with an option to accept the call (screen shot 1205). In some embodiments where the option to accept the call is not presented until an agent 130 is available, optionally a countdown timer may be presented to the customer 115 to let the customer 115 know when an agent 130 is expected to become available. If the customer 115 elects to accept the call by pressing the + icon, the call connects and the VoIP client 208 automatically causes the mobile device to activate speaker phone mode. Optionally, where the mobile phone is actively connected to a remote audio device, such as where the mobile phone is connected via Bluetooth to a remote headset, audio from the phone call may be relayed via Bluetooth rather than by placing the phone in speaker phone mode. As shown in screen shot 1210, the user interface automatically reverts back to the application user interface 1208 so that the customer 115 does not need to exit out of the application 122 to place a phone call to the call center 140. Optionally, when the telephone call is completed to the call center 140, a visualization session may be created as well as described herein, on which a live video 1212 of the agent 130 is shown back to the customer 115.

FIG. 13 is a flow diagram of a process for ending a telephone call on a mobile device 120 while working with another application on the mobile device 120 according to some embodiments. As shown in FIG. 13, if the customer 115 wants to end the call, the customer 115 can simply interact with visualization session controls 1302 displayed within the user interface 1208 shown in screen shot 1300. If the customer 115 selects one of the visualization session controls 1302 to disconnect the telephone call and visualization session, the VoIP client 208 ends the telephone call without requiring the customer 115 to leave the application user interface 1208 as shown in screen shot 1305. In some embodiments the view of the application user interface 1208 reverts back to the state shown in screen shot 1200 in which the customer 115 is presented once again with control object 1202 that may be used to initiate a subsequent call to the call center 140.

As described herein, to provide security on visualization sessions, the agent 130 authenticates to the visualization system 110 before the visualization system 110 will allow the agent 130 to join a visualization session. Authentication/authorization ensures that the agent 130 has sufficient privilege to access visualization sessions on which customer 115 displays of applications 122 will be visible. In some embodiments, not all agents 130 have access to visualization sessions. In some embodiments, groups of agents 130 have access to visualization sessions with particular groups of customers 115 and, hence, have access to only a subset of the visualization sessions.

In some embodiments, the authentication system 160 generates and provides authorization tokens to the agents 130. The authentication system 160 may be implemented as a stand-alone server, may be implemented as part of the visualization system 110, may be implemented as part of the application system 150, or may be part of the company's single-sign-on service, such as SAML.

When an agent 130 issues a request to the visualization system 110 to join a visualization session, the authentication system 160 verifies the identity of the agent 130 and ensures that the particular agent 130 is authorized to carry out the requested operation. In one implementation this is accomplished using authorization tokens issued by the authentication system 160.

All agent 130 side requests to the visualization system 110 carry an authorization token which is obtained from the authentication system 160. In one implementation, the authentication system 160 uses the JSON Web Token (JWT) standard for creating, signing, and verifying authorization tokens.

For an agent 130 to obtain an authorization token, the agent 130 passes credentials to the authentication system 160 to prove the agent's identity. The authentication system 160 verifies the agent's credentials (authentication) and determines whether the agent 130 has permission to access the visualization system 110 and the scope of the agent's permission (authorization). Depending on the implementation, the authentication system 160 may be accessible via Soap 1.2 Web Services Definition Language (WSDL), JavaScript Object Notation (JSON) Representational State Transfer (REST), or eXtensible Markup Language (XML) REST. REST specifies a set of four HTTP methods that enable actions to be taken with a URL. The four methods defined in REST are Post (create), Get (read), Put (update or create), and Delete (delete). One advantage of using REST is that it is easy to be called from JavaScript, so that script running on the agent 130 can easily interface with authentication system 160 to request an authorization token. Also, since REST is built on HTTP, all the security features for authentication available in HTTP are available in REST.

The authentication system 160 may accept many different forms of credentials depending on the implementation. For example, the authentication system 160 may accept any combination of identifying credentials, such as the agent's user name and password, Security Assertion Markup Language (SAML) or other known methods. Other credentials may be used, and the particular credentials required will depend on the implementation. In one implementation the authentication system 160 does not accept the agent's CRM system login credentials as sufficient to access visualization sessions. This enables access to visualization system 110 to be separated from access to the CRM 145, so that simply obtaining access by an agent 130 to the CRM system does not automatically enable the agent 130 to also have access to visualization sessions of customers 115.

In some embodiments, in addition to credentials, the agent 130 must specify a Group ID. The group ID specifies a subset of customers 115 for example customers 115 running a particular application 122. This allows the agent 130 to be restricted to joining visualization sessions only associated with the particular application system 150. A particular agent 130 may be a member of multiple groups, but at any given time the agent 130 authenticates in only one particular group. In some embodiments, if an agent 130 needs to carry out operations in multiple groups, the agent 130 must obtain multiple tokens—one token for each group.

In some embodiments, access to visualization sessions requires the agent 130 to have a current visualization subscription with the visualization system 110. When the agent 130 attempts to obtain a token from the authentication system 160, the authentication system 160 will check whether the agent 130 is authorized to access the visualization system 110 and that the visualization subscription is current, in addition to determining authentication.

To prevent tokens from enabling unfettered access to visualization sessions for extended periods of time, in some embodiments the tokens have a "time to live" attribute which specifies a period of time during which the token will remain valid. When requesting a token, the authentication system 160 specifies a time-to-live duration for the token. In some embodiments, tokens may be issued for the duration requested by the agent 130, with a maximum duration of up to two hours or other time interval. Since obtaining a token is resource intensive on the authentication system 160, the agent 130 should obtain a token and reuse it until it expires or the agent 130 logs out, rather than obtaining a new token for every operation.

The token may be obtained server side using the SOAP or REST API. It may be stored server side, for example in session state, and used in subsequent server-side requests to the visualization system 110. Alternatively, a token obtained server side may be used client side by the visualization JavaScript API on the agent 130.

When a join visualization request is made, the visualization system 110 will validate the authorization token presented in connection with the request. The token may be presented by the agent 130 in many ways, for example in the authorization header for REST requests, or in the first message on a WebSocket connection. The visualization system 110 verifies the token signature, that it has not expired, and that the group ID in the token matches the group ID in the request. In some implementations an agent 130 is able to interact with all customers 115 associated with the group ID, and in other implementations the agent 130 is authorized to interact with a subset of customers 115 associated with the group ID.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), cache, optical or magnetic disk, CD, DVD, internal hard drive, external hard drive, memory stick, network-attached storage, storage in a networking "cloud" service, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. Embodiments of the program may be stored in object form, in asm.js form, or in WebAssembly form. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s), server(s), personal digital assistant(s) (PDA(s)), handheld device(s) such as cellular telephone(s) or smart cellphone(s), laptop(s), tablet or handheld computer (s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, a graphic processing unit, an arithmetic logic unit, an application-specific integrated circuit (IC), a video processing unit, and/or a task engine, with such examples provided for illustration and not limitation.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of implementing a visualization session, comprising:
    receiving, by an agent, a contact event from a customer using an application client;
    instructing the customer, by the agent, to start a visualization session at a visualization system;
    starting the visualization session at the visualization system by the customer; and
    authenticating by the agent to the visualization system to join the visualization session;
    wherein the customer is not known at the visualization system prior to implementing the step of starting the visualization session at the visualization system;
    determining that the application client in use by the customer is a hybrid application client, in which a first portion of a user interface of the application client is natively drawn using system calls to an operating system and a second portion of the user interface is output via a browser;
    using screen share technology, by the customer, to capture and transmit the first portion of the user interface on a visualization session; and
    using co-browse technology, by the customer, to capture and transmit the second portion of the user interface on the visualization session
    wherein the agent does not know the type of visualization technology to be used with the customer prior to instructing the customer to start the visualization session.

2. The method of claim 1, wherein the agent is an intelligent natural language virtual assistant.

3. The method of claim 1, wherein the visualization session is not implemented using WebRTC.

4. The method of claim 1, wherein the contact event is a telephone call on the public switched telephone network.

5. The method of claim 4, wherein the contact event is implemented using a communication device that is not being used to execute the application client.

6. The method of claim 1, wherein the contact event is a Voice over Internet Protocol (VoIP) call.

7. The method of claim 6, further comprising assigning a temporary telephone number or a telephone number extension to the customer in connection with the VoIP call.

8. The method of claim 7, further comprising posting the temporary telephone number or the telephone number extension, by the customer, to a presence system.

9. The method of claim 7, wherein the contact event includes an identification of the temporary telephone number or the telephone number extension.

10. The method of claim 1, wherein the application client includes a screensharing client.

11. The method of claim 1, wherein the application client includes a presence client.

12. The method of claim 1, wherein the application client includes a VoIP client.

13. The method of claim 1, wherein the application client includes a video client configured to receive video from the agent.

14. The method of claim 1, wherein the co-browse technology comprises co-browse script configured to forward the DOM of the browser to the agent.

15. The method of claim 1, further comprising starting a sub-session by the agent to show agent information back to the customer.

16. The method of claim 15, wherein the agent information is video.

17. The method of claim 15, wherein the visualization session is used to exchange messages associated with establishing the sub-session.

18. The method of claim 1, further comprising assigning a visualization identification value to the visualization session, but not using the visualization identification value as part of a security model for the visualization session.

19. The method of claim 1, wherein the application has a native layer built to run on a mobile device, and an embedded browser configured to implement a user interface of the application.

20. The method of claim 1, wherein the step of starting the visualization session at the visualization system by the customer comprises:
- determining whether a user interface of the application is natively drawn using system calls or implemented using an embedded browser;
- using screen share technology, by the customer, to capture and transmit a view of the user interface on the visualization session when the user interface is natively drawn; and
- using co-browse technology, by the customer, to capture and transmit a view of the user interface on the visualization session when the user interface is implemented using the embedded browser.

* * * * *